United States Patent [19]

Stoyell et al.

[11] Patent Number: 5,543,047
[45] Date of Patent: Aug. 6, 1996

[54] FILTER WITH OVER-LAID PLEATS IN INTIMATE CONTACT

[75] Inventors: Richard C. Stoyell, Moravia; Kenneth M. Williamson, Jamesville; Scott D. Hopkins, Dryden; Stephen A. Geibel, Cortland; Terry L. Wolff, Marathon, all of N.Y.

[73] Assignee: Pall Corporation, East Hills, N.Y.

[21] Appl. No.: 170,934

[22] Filed: Dec. 21, 1993

Related U.S. Application Data

[63] Continuation-in-part of Ser. No. 972,839, Nov. 6, 1992, abandoned.

[30] Foreign Application Priority Data

Nov. 8, 1993 [WO] WIPO ..................... PCT/US93/10697

[51] Int. Cl.⁶ ............................................. B01D 27/06
[52] U.S. Cl. ..................... 210/493.2; 210/493.5; 210/509; 493/941; 55/500; 55/521
[58] Field of Search .......................... 210/455, 495, 210/493.5, 403, 321.77, 321.86, 485, 490, 493.2, 508, 509; 493/403, 941; 55/500, 521

[56] References Cited

U.S. PATENT DOCUMENTS

| | | |
|---|---|---|
| 362,551 | 5/1887 | Stiely . |
| 624,014 | 5/1899 | Hagerty . |
| 671,790 | 4/1901 | Chandler . |
| 930,401 | 8/1909 | Monteagle . |
| 1,001,929 | 8/1911 | Collins . |
| 1,669,461 | 5/1928 | Gamble . |
| 2,064,511 | 12/1936 | Wells ..................................... 210/165 |
| 2,122,111 | 6/1938 | Poelman et al. . |
| 2,322,548 | 6/1943 | Sigmund . |
| 2,372,545 | 3/1945 | Breedlove . |
| 2,395,449 | 2/1946 | Briggs ..................................... 210/204 |

(List continued on next page.)

FOREIGN PATENT DOCUMENTS

| | | |
|---|---|---|
| 547695 | 11/1959 | Belgium . |
| 083789 | 7/1983 | European Pat. Off. . |
| 724242 | 8/1942 | Germany . |
| 2354851 | 5/1974 | Germany . |
| 3513062 | 10/1986 | Germany . |
| 53-2390 | 1/1978 | Japan . |
| 55-39279 | 3/1980 | Japan . |
| 55-34143 | 3/1980 | Japan . |
| 61-61012 | 4/1986 | Japan . |
| 63-185423 | 8/1988 | Japan . |
| 588991 | 6/1947 | United Kingdom . |
| 723200 | 2/1955 | United Kingdom . |
| 758277 | 10/1956 | United Kingdom . |
| 855068 | 11/1960 | United Kingdom . |
| 1003164 | 9/1965 | United Kingdom . |
| 1005987 | 9/1965 | United Kingdom . |
| 1337170 | 11/1973 | United Kingdom . |
| 1400147 | 7/1975 | United Kingdom . |
| 1543404 | 4/1979 | United Kingdom . |
| 1549302 | 7/1979 | United Kingdom . |
| 2106001 | 4/1983 | United Kingdom . |
| 2192810 | 1/1988 | United Kingdom . |
| 2214448 | 9/1989 | United Kingdom . |

OTHER PUBLICATIONS

Illustration of Amicon Filter ("Attachment A").
Advanced Spiral Concept ("Attachment B").

*Primary Examiner*—W. L. Walker
*Attorney, Agent, or Firm*—Leydig, Voit & Mayer

[57] ABSTRACT

A filter includes a cylindrical filter element having a longitudinal axis, first and second end surfaces, and a plurality of longitudinal pleats. Each of the pleats has a pair of legs with first and second surfaces. The pleats are in a laid-over state in which the first surface of each leg is in intimate contact with the first surface of an adjoining leg and the second surface of each leg is in intimate contact with the second surface of an adjoining leg over substantially the entire height of each leg and over a continuous region extending for at least approximately 50% of the axial length of the filter element. An impervious end cap is connected to the first end surface of the filter element.

105 Claims, 12 Drawing Sheets

U.S. PATENT DOCUMENTS

| | | | |
|---|---|---|---|
| 2,401,222 | 5/1946 | Briggs . | |
| 2,420,414 | 5/1947 | Briggs | 210/169 |
| 2,537,992 | 1/1951 | Gross et al. . | |
| 2,539,450 | 1/1951 | Magill . | |
| 2,586,078 | 2/1952 | O'Malley . | |
| 2,689,652 | 9/1954 | Gretzinger | 210/169 |
| 2,768,751 | 10/1956 | Booth | 210/169 |
| 2,801,009 | 7/1957 | Bowers | 210/493 |
| 2,837,214 | 6/1958 | Kasten | 210/300 |
| 2,923,447 | 2/1960 | Ezbelent . | |
| 3,026,610 | 3/1962 | Wakefield | 29/451 |
| 3,042,571 | 7/1962 | Jackson . | |
| 3,061,107 | 10/1962 | Taylor | 210/487 |
| 3,063,888 | 11/1962 | Howard et al. | 156/187 |
| 3,165,472 | 2/1965 | Briggs | 210/457 |
| 3,174,625 | 3/1965 | Briggs | 210/493 |
| 3,189,179 | 6/1965 | McMichael | 210/238 |
| 3,241,680 | 3/1966 | Humbert, Jr. | 210/457 |
| 3,261,473 | 7/1966 | Riede | 210/282 |
| 3,268,442 | 8/1966 | Pall et al. . | |
| 3,306,794 | 2/1967 | Humbert, Jr. . | |
| 3,334,752 | 8/1967 | Matravers | 210/457 |
| 3,386,583 | 6/1968 | Merten | 210/321 |
| 3,397,793 | 8/1968 | MacDonnell | 210/457 |
| 3,417,870 | 12/1968 | Bray | 210/321 |
| 3,426,910 | 2/1969 | Winzen | 210/493 |
| 3,442,392 | 5/1969 | Skelley | 210/491 |
| 3,450,632 | 6/1969 | Olson et al. | 210/23 |
| 3,520,417 | 7/1970 | Durr et al. | 210/493 |
| 3,578,175 | 5/1971 | Manijikian | 210/489 |
| 3,692,184 | 9/1972 | Miller, Jr. et al. | 210/437 |
| 3,695,443 | 10/1972 | Schmidt, Jr. | 210/315 |
| 3,769,128 | 10/1973 | Manjikian | 156/185 |
| 3,799,354 | 3/1974 | Buckman et al. | 210/493 |
| 3,804,259 | 4/1974 | Riggleman et al. | 210/490 |
| 3,809,199 | 5/1974 | Bessiere . | |
| 3,813,334 | 5/1974 | Bray | 210/321 |
| 3,827,566 | 8/1974 | Ponce | 210/338 |
| 3,880,755 | 4/1975 | Thomas et al. | 210/91 |
| 4,033,868 | 7/1977 | Meichsner et al. . | |
| 4,033,881 | 7/1977 | Pall | 210/491 |
| 4,046,697 | 9/1977 | Briggs et al. | 210/457 |
| 4,065,341 | 12/1977 | Cub | 156/187 |
| 4,089,783 | 5/1978 | Holyoak | 210/358 |
| 4,092,246 | 5/1978 | Kummer | 210/65 |
| 4,101,423 | 7/1978 | Merrill et al. | 210/494 |
| 4,154,688 | 5/1979 | Pall | 210/487 |
| 4,181,070 | 1/1980 | Robbins et al. . | |
| 4,201,119 | 5/1980 | Wolf . | |
| 4,206,050 | 6/1980 | Walch et al. . | |
| 4,214,612 | 7/1980 | de Putter . | |
| 4,252,591 | 2/1981 | Rosenberg | 156/203 |
| 4,293,414 | 10/1981 | Gianneli | 210/193 |
| 4,402,830 | 9/1983 | Pall | 210/457 |
| 4,421,646 | 12/1983 | Correge et al. | 210/291 |
| 4,443,346 | 4/1984 | Muller . | |
| 4,500,426 | 2/1985 | Ishii et al. | 210/321.3 |
| 4,519,531 | 5/1985 | Clerici . | |
| 4,526,688 | 7/1985 | Schmidt, Jr. et al. | 210/323 |
| 4,564,376 | 1/1986 | Billiet | 55/486 |
| 4,655,921 | 4/1987 | Fujimoto | 210/489 |
| 4,660,779 | 4/1987 | Nemesi et al. | 242/7.02 |
| 4,673,503 | 6/1987 | Fujimoto | 210/493 |
| 4,692,196 | 9/1987 | Ellegood et al. | 156/187 |
| 4,752,396 | 6/1988 | Schmitt | 210/494 |
| 4,765,893 | 8/1988 | Kohlheb | 210/315 |
| 4,839,037 | 6/1989 | Bertelsen et al. | 210/97 |
| 4,842,736 | 6/1989 | Bray et al. | 210/321 |
| 4,855,058 | 8/1989 | Holland et al. | 210/652 |
| 4,872,990 | 10/1989 | Van Wijk | 210/644 |
| 4,877,527 | 10/1989 | Brownell | 210/489 |
| 4,882,056 | 11/1989 | Degen et al. | 210/490 |
| 4,902,417 | 2/1990 | Lien | 210/321 |
| 4,904,380 | 2/1990 | Bhanot et al. | 210/193 |
| 4,940,500 | 7/1990 | Tadokoro et al. | 156/204 |
| 5,028,329 | 7/1991 | Drioli | 210/490 |
| 5,028,465 | 7/1991 | Kinsley, Jr. | 428/36.3 |
| 5,039,413 | 8/1991 | Harwood et al. | 210/457 |
| 5,071,555 | 12/1991 | Enbom | 210/493 |
| 5,084,178 | 1/1992 | Miller et al. | 210/493.5 |
| 5,092,990 | 3/1992 | Muramatsu et al. . | |
| 5,096,584 | 3/1992 | Reddy et al. | 210/321.74 |
| 5,096,591 | 3/1992 | Benn | 210/651 |
| 5,114,582 | 5/1992 | Sandstrom et al. | 210/321.74 |
| 5,120,296 | 6/1992 | Yamaguchi et al. | 493/352 |
| 5,130,023 | 7/1992 | Feint | 210/493.2 |
| 5,147,541 | 9/1992 | McDermott, Jr. et al. | 210/321.74 |
| 5,174,896 | 12/1992 | Harms, II | 210/455 |
| 5,204,002 | 4/1993 | Belfort et al. | 210/634 |
| 5,252,207 | 10/1993 | Miller et al. | 210/335 |
| 5,275,743 | 1/1994 | Miller et al. | 210/767 |
| 5,403,482 | 4/1995 | Steere et al. | 210/489 |

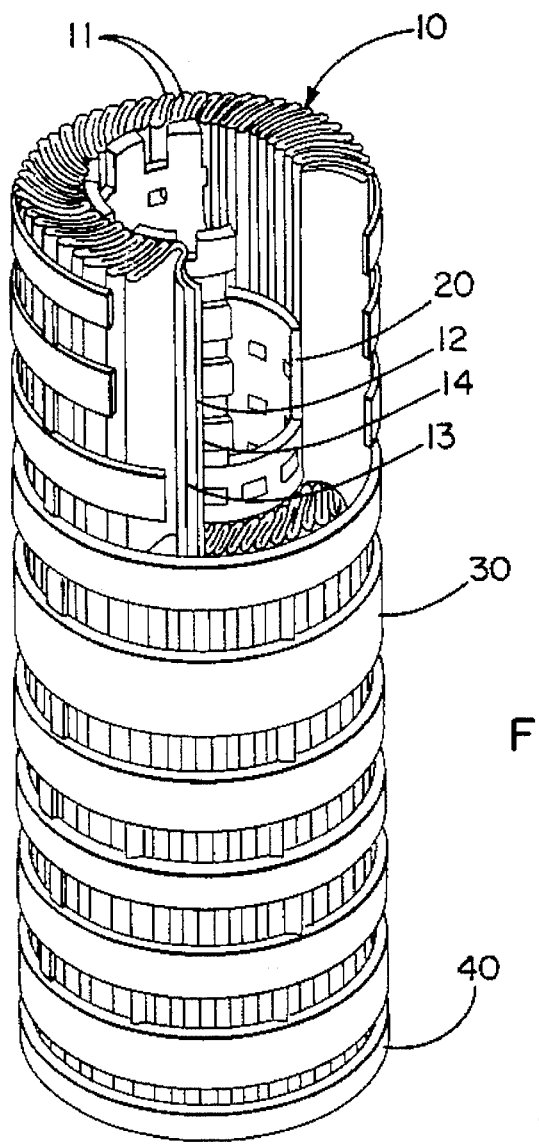
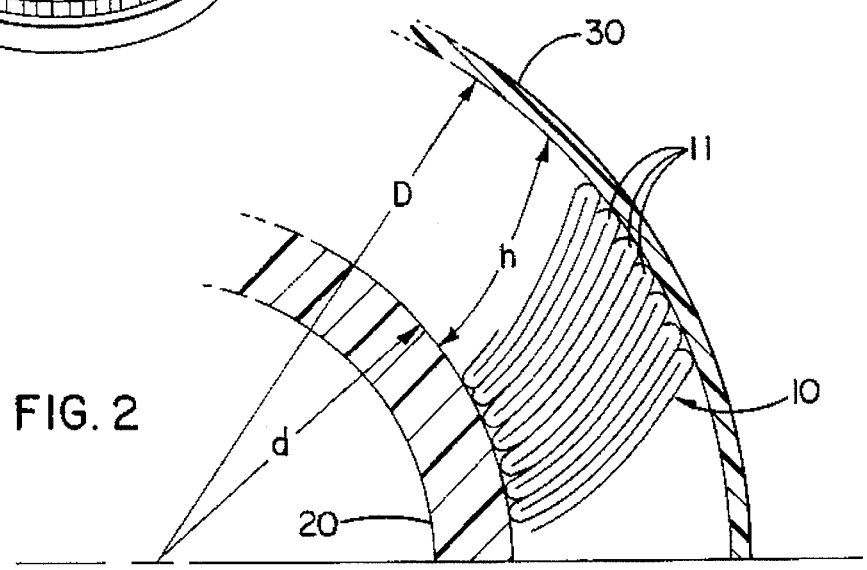
FIG. 1
FIG. 2

FILTER WITH OVER-LAID PLEATS IN INTIMATE CONTACT

REFERENCE TO RELATED APPLICATIONS

This application is a continuation-in-part of application Ser. No. 07/972,839, filed on Nov. 6, 1992, now abandoned, and a continuation of International Application No. PCT/US93/10697, filed on Nov. 8, 1993.

BACKGROUND OF THE INVENTION

1. Field of the Invention

This invention relates to pleated filter elements, methods and apparatus for manufacturing pleated filter elements and methods for precoating and backwashing filter elements.

2. Description of the Related Art

Cylindrical filter elements having radially-extending, longitudinal pleats are among the most common types of filter elements and are used to filter innumerable fluids, i.e., liquids or gases. (Throughout this application, "filter" and "filtration" include both the removal of particulates, e.g., by sieving or trapping within a porous medium, and the removal of impurities, e.g., by ion exchange resins or sorbents). In a typical cylindrical pleated filter element, a plurality of pleats are arranged around a tubular core to define a cylinder. As viewed in a transverse cross-section, the individual pleats of such a filter element extend radially outward from the core toward the outer periphery of the filter element. It is good design practice to have enough pleats in a cylindrical filter element so that adjoining pleats contact one another along the circumference of the core. However, because of the radial geometry of the pleats, the spacing between adjacent pleats necessarily increases as the distance from the center of the core increases. Accordingly, in a typical cylindrical pleated filter element, there is a great deal of unused space between adjacent pleats.

Making a filter element larger to compensate for the unused space between adjacent pleats is frequently not possible. In the filter industry today, the dimensions of filter housings within which the filter elements are enclosed have become fairly standardized. Accordingly, a major challenge of filter designers is to increase the filtering capacity of a filter element, i.e., the usable surface area, without altering its external dimensions so that it can be employed with existing filter housings.

While cylindrical pleated filter elements are very common, they have typically not been used as precoat filters. A precoat filter is a type of filter in which a slurry is applied as a cake, called a precoat, to the exterior of a non-pleated, porous support structure called a septum. After the precoat is applied to the septum, a fluid to be filtered is then directed through the precoat and the septum where the precoat serves to filter the fluid. Pleated filter elements have not been used as supports for septa because the pleats tend to collapse as the precoat is applied or as the fluid flows through the precoat.

SUMMARY OF THE INVENTION

It is therefore an object of the present invention to provide a filter which has a greater filtering capacity than a conventional filter of the same external dimensions.

It is another object of the present invention to provide a filter having good strength and resistance to handling.

It is a further object of the present invention to provide a precoat filter having a pleated filter element.

It is yet another object of the present invention to provide an apparatus and method for forming a material into pleats of a form particularly suitable for a filter according to the present invention.

The present invention provides a filter including a cylindrical filter element having an end surface and an impervious end cap connected to the end surface. The filter element has a plurality of longitudinal pleats, each of the pleats having a pair of legs. Each of the legs has a first surface and a second surface. The pleats are in a laid-over state in which the first surface of each leg is in intimate contact with the first surface of an adjoining leg and the second surface of each leg is in intimate contact with the second surface of an adjoining leg over substantially the entire height of each leg and over a continuous region extending for at least approximately 50% of the axial length of the filter element.

The present invention also provides a filter comprising a cylindrical filter element having an inner radius, outer radius, and a plurality of longitudinal pleats. Each pleat has a height greater than the difference between the outer and inner radii. The filter further comprises a wrap member wrapped around the filter element.

Because the pleats are in a laid-over state or because the height of each pleat is greater than the difference between the outer and inner radii, the height of the pleats is much larger than that of a conventional filter of the same dimensions. As a result, the surface area of a filter according to the present invention usable for filtration, which is proportional to the pleat height, can be greatly increased, resulting in a longer lifespan.

A filter embodying the present invention may have a hollow center and a cylindrical outer periphery. It can be used for outside-in flow in which a fluid to be filtered flows from the outer periphery through the filter element into the hollow center, or it can be used for inside-out flow in which fluid flows from the hollow center through the filter element to the outer periphery.

The present invention also provides a pleating apparatus which may form a material into pleats having unequal legs. The pleating apparatus includes a pleating member and a stripper member having pleating surfaces spaced by a gap. At least one of the pleating surfaces is curved or extends at an acute angle to a support surface for supporting a material to be pleated. The pleating member and the stripper member are moved relative to each other to compress the material within the gap and thereby form a pleat, which may have unequal legs. As a result of the pleats having unequal legs, they can readily be formed into a laid-over state. A pleating apparatus according to the present invention can be used to pleat not only single-layer materials, but can also be used to pleat multi-layer composites.

The present invention further provides a precoat filter including a pleated filter element having a longitudinal axis and a plurality of longitudinal pleats. A septum adapted to support a precoat layer is wrapped around and bears against a periphery of the filter element.

In preferred embodiments, the pleated filter element of the precoat filter is cylindrical and has laid-over pleats extending non-radially with respect to the longitudinal axis of the filter element. Alternatively, the pleats may extend radially, with adjoining pleats pressed into intimate contact with one another by wedges or the like. A flow straightener such as a mesh may be disposed around the septum to prevent turbulence from damaging the precoat layer.

The pleated filter element of a precoat filter according to the present invention can have a large surface area, so it can trap fines which pass through the precoat layer and prevent them from flowing to the downstream side of the filter. By having its pleats in a laid-over state or pressed into intimate contact with one another, the filter element can provide a more stable support for the septum and thereby prevent cracking of the precoat layer in response to fluctuations in the pressure across the filter.

Additionaly, the present invention provides a method of assembling a filter and filtering methods, all as defined by the attached claims.

BRIEF DESCRIPTION OF THE DRAWINGS

FIG. 1 is a cut-away perspective view of a filter.

FIG. 2 is a transverse cross-sectional view of a portion of the filter of FIG. 1.

DESCRIPTION OF PREFERRED EMBODIMENTS

FIG. 1 illustrates a first embodiment of a filter according to the present invention. This embodiment is generally cylindrical in form and includes a pleated filter element 10 having a plurality of longitudinal pleats 11. A cylindrical core 20 may be coaxially disposed along the inner periphery of the filter element 10, and a cylindrical cage or wrap 30 may be disposed along the outer periphery of the filter element 10.

Figure 3:
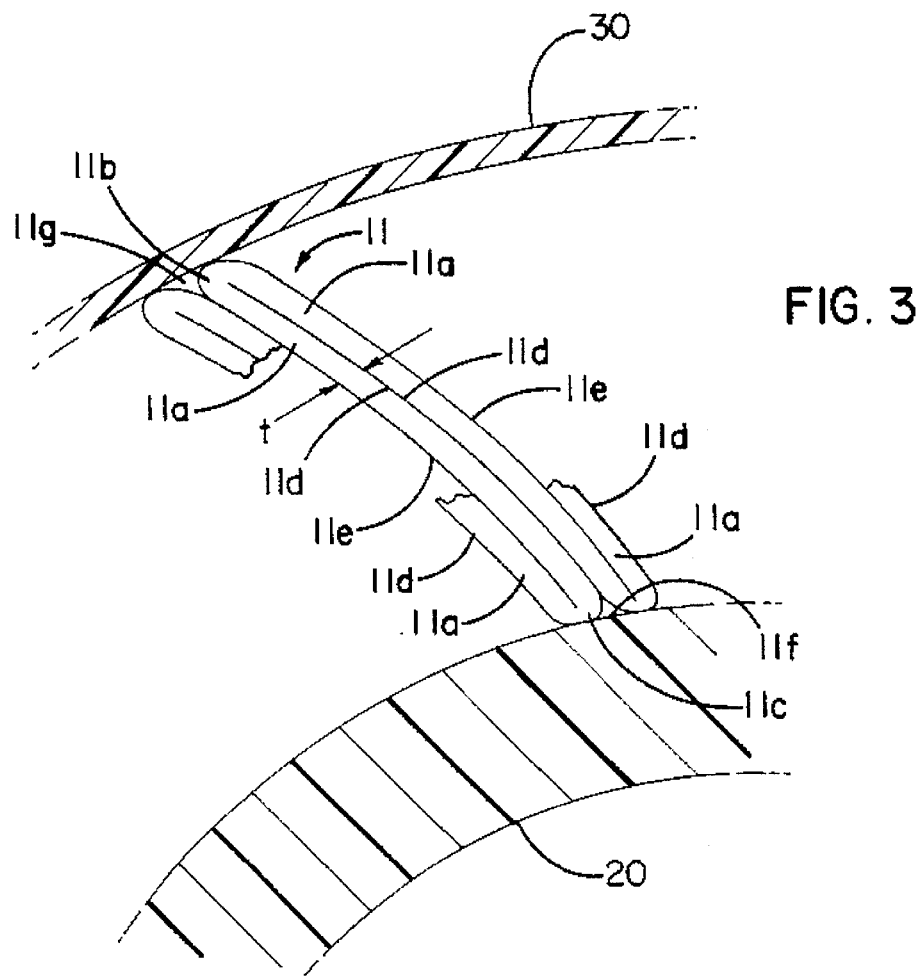
FIG. 3 is an enlarged cross-sectional view of one of the pleats of FIG. 2.

As shown in FIGS. 2 and 3, each pleat 11 has two legs 11a which are joined to one another at the crown 11b of the outer periphery of the filter element 10 and which are joined to a leg 11a of an adjacent pleat 11 at the root 11c of the inner periphery of the filter element 10. Each leg 11a has an internal surface 11d which opposes the internal surface 11d of the other leg 11a in the same pleat 11, and an external surface 11e which opposes the external surface 11e of a leg 11a of an adjacent pleat 11. When the filter element 10 is being used such that fluid flows radially inwardly through the element, the internal surfaces 11d of the legs 11a form the downstream surface of the filter element 10, while the external surfaces 11e form the upstream surface of the filter element 10. Alternatively, when the filter element 10 is being used such that fluid flows radially outwardly through the element, the internal surfaces 11d and the external surfaces 11e respectively form the upstream and downstream surfaces of the filter element 10.

As shown in the figures, the opposing inner surfaces 11d of the legs 11a of each pleat 11 are in intimate contact with one another over substantially the entire height h of the legs 11a and of the pleat 11 and over a continuous region extending for a significant portion of the axial length of the filter element 10. In addition, the opposing external surfaces 11e of the legs 11a of adjacent pleats 11 are in intimate contact over substantially the entire height h of the adjacent pleats 11 and legs 11a and over a continuous region extending for a significant portion of the axial length of the filter element. Here, the height h (shown in FIG. 2) of the pleats 11 and the legs 11a is measured in a direction along the surfaces of the legs 11a and extends from the inner periphery to the outer periphery of the filter element 10. The condition illustrated in FIGS. 2 and 3 in which the surfaces of the legs 11a of the pleats 11 are in intimate contact and in which the height h of each pleat 11 is greater than the distance between the inner and outer peripheries of the filter element 10 (i.e., [D-d]/2 in FIG. 2) will be referred to as a laid-over state. In the laid-over state, pleats may extend, for example, in an arcuate or angled fashion or in a straight, non-radial direction, and there may be is substantially no empty space between adjacent pleats, and virtually all of the volume between the inner and outer peripheries of the filter element 10 may be occupied by the filter element 10 and can be effectively used for filtration.

Because the filter element 10 is formed from a material having a finite thickness t, at the radially inner and outer ends of the pleats 11 where the filter element 10 is folded back upon itself to form the pleats 11, the pleats 11 will be somewhat rounded. As a result, at the radially inner ends of the pleats 11, small triangular gaps 11f are formed between the opposing internal surfaces 11d of adjoining legs 11a, and at the radially outer ends of the pleats 11, small triangular gaps 11g are formed between the opposing external surfaces 11e of adjoining legs 11a. However, in the present invention, the height of these gaps 11f and 11g as measured along the height of the pleats is preferably extremely small. The height of the gaps 11f adjoining the inner diameter of the filter element 10 is preferably no more than approximately t and more preferably no more than approximately ½ t, wherein t is the thickness of the material forming the filter element 10, as shown in FIG. 3. The height of the gaps 11g adjoining the outer diameter of the filter element 10 is preferably no more than approximately 4 t and more preferably no more than approximately 2 t. The sharper the pleats 11, i.e., the less rounded are their radially inner and outer ends, the smaller can be the heights of the gaps 11f and 11g and the greater can be the percent of the volume between the inner and outer peripheries of the filter element 10 which is available for filtration.

The opposing surfaces of adjoining legs 11a of the pleats need not be in intimate contact over the entire axial length of the filter element 10, but the greater is the length in the axial direction of the region of intimate contact, the more effectively used is the space between the inner and outer periphery of the filter element 10. Therefore, adjoining legs 11a are in intimate contact over a continuous region which preferably extends for at least approximately 50%, more preferably at least approximately 75%, and most preferably approximately 95–100% of the axial length of the filter element 10.

The filter element 10 includes a filter medium and drainage means disposed on at least one side, preferably the upstream side, and more preferably on both the upstream and downstream sides of the filter medium. The drainage means prevents opposing surfaces of the filter medium from coming into contact with one another and enables fluid to evenly flow to or from substantially all portions of the surface of the filter medium when the pleats are in the laid-over state. Thus, virtually the entire surface area of the filter medium may be effectively used for filtration.

In the embodiment of FIG. 1, the filter element 10 comprises a three-layer composite of a filter medium 12, upstream drainage means in the form of an upstream drainage layer 13 disposed on the upstream surface of the filter medium 12, and downstream drainage means in the form of a downstream drainage layer 14 disposed on the downstream surface of the filter medium 12. Here, upstream and downstream surfaces may refer to the exterior and interior surfaces when the filter is being subjected to radially inward fluid flow or to interior and exterior surfaces when the filter is being subjected to radially outward fluid flow.

There are no particular restrictions on the type of filter medium which can be employed in the present invention, and it can be selected in accordance with the fluid which is to be filtered and the desired filtering characteristics. The filter medium 12 can be used to filter fluids such as liquids, gases, or mixtures thereof. The filter may comprise a porous film or a fibrous sheet or mass; it may have a uniform or graded pore structure and any appropriate effective pore size; it may be formed from any suitable material, such as a natural or synthetic polymer, glass, or metal.

The filter medium 12 may comprise a single layer, or a plurality of layers of the same medium may be disposed atop one another to a desired thickness. Furthermore, it is possible for the filter medium to include two or more layers having different filtering characteristics, e.g., with one layer acting as a prefilter for the second layer.

The upstream and/or downstream drainage layers may be regions of a single, unitary porous sheet having a finely-pored center region, which serves as a filter medium, and coarsely-pored upstream and/or downstream regions which serve as the drainage layers. However, the drainage layers are preferably distinct layers separate from the filter medium.

The upstream and downstream drainage layers 13 and 14 can be made of any materials having suitable edgewise flow characteristics, i.e., suitable resistance to fluid flow through the layer in a direction parallel to its surface. The edgewise flow resistance of the drainage layer is preferably low enough that the pressure drop in the drainage layer is less than the pressure drop across the filter medium, thereby providing an even distribution of fluid along the surface of the filter medium. The drainage layers can be in the form of a mesh or screen or a porous woven or non-woven sheet.

Meshes and screens (also called netting) come in various forms. For high temperature applications, a metallic mesh or screen may be employed, while for lower temperature applications, a polymeric mesh may be particularly suitable. Polymeric meshes come in the form of woven meshes and extruded meshes. Either type may be employed, but extruded meshes are generally preferable because they are smoother and therefore produce less abrasion of adjoining layers of the filter composite. An extruded mesh may have a first set of parallel strands and a second set of parallel strands intersecting the first set of strands at an angle. Extruded meshes may be classified as either symmetrical or non-symmetrical. In a symmetrical mesh, neither of the first or second sets of strands extends in the so-called "machine direction" of the mesh, which is the direction in which the mesh emerges from a mesh manufacturing machine. In a non-symmetrical mesh, one of the sets of strands extends parallel to the machine direction. In the present invention, it is possible to use either symmetrical or non-symmetrical meshes. Non-symmetrical meshes have a somewhat lower resistance to edgewise flow per thickness than do symmetrical meshes. Therefore, for a given edgewise flow resistance, a non-symmetrical mesh can be thinner than a symmetrical mesh, so the number of pleats in a filter element 10 using a non-symmetrical mesh can be larger than for a filter element of the same size using a symmetrical mesh. On the other hand, symmetrical meshes have the advantage that they are easier to work with when manufacturing a pleated filter element 10.

Meshes may be characterized by their thickness and by the number of strands per inch. These dimensions are not limited to any particular values and can be chosen in accordance with the desired edgewise flow characteristics of the mesh and the desired strength. Typically, the mesh will have a mesh count of at least 10 strands per inch.

In embodiments of the present invention, the opposing surfaces of the pleats are in intimate contact. Consequently, the strands of the drainage mesh of each leg of the pleats are pressed against the strands of the drainage mesh of an adjacent leg of the pleats. If the strands of the mesh on two opposing surfaces are parallel to one another, the strands may have a tendency to "nest", i.e., to fit between one another rather than to lie atop one another. This degrades the drainage properties of the mesh and decreases its ability to provide drainage for the filter medium. With a non-symmetric mesh, care must be taken that the machine direction strands are on the side of the mesh facing toward the filter medium rather than away from it so as to prevent nesting of the strands when the filter element 10 is corrugated. With a symmetric mesh, however, there are no machine direction strands, so it does not matter which surface of the mesh faces the filter medium, and less care is required in assembly of the filter element 10.

Regardless of whether a mesh is symmetric or non-symmetric, the strands of the meshes can be prevented from nesting if the meshes are oriented as follows. Assuming that the first set of strands is on the side of a mesh facing toward the filter medium and the second set of strands is separated from the filter medium by the first set of strands, the second set of strands can be prevented from nesting when the pleats are in a laid-over state if the second set of strands extends along lines intersecting the longitudinal axis of the filter element at an angle between 0 and 90 degrees. If the second set of strands extends along lines intersecting the axis at an angle of either 0 or 90 degrees, i.e., if the second set of strands is either parallel or perpendicular to the axis of the filter element, it is possible for the second set of strands to nest. However, at any angle between these limits, the second set of strands will lie atop each other without nesting.

If the mesh is so oriented, when the pleats 11 assume a laid-over state, a surface which is tangent to the second strands of the mesh on each leg of a pleat will be in intimate contact with a surface which is tangent to the second strands of the mesh of an adjoining leg.

Specific examples of suitable extruded polymeric meshes are those available from Nalle Plastics (Austin, Tex.) under the trade names Naltex, Zicot, and Ultraflo.

Meshes are particularly suitable as drainage layers when the filter medium is a fibrous laid-down medium. On the other hand, when the filter medium is a membrane, a woven or non-woven fabric is more suitable for use as the drainage layer because a fabric is usually smoother than a mesh and produces less abrasion of adjoining layers of the filter composite. An example of a suitable non-woven fabric for use as a drainage layer is a polyester non-woven fabric sold under the trade designation Reemay 2011 by Reemay, Inc.

The upstream and downstream drainage layers 13 and 14 can be of the same or different construction. It has been found that the pressure drop across the filter medium 12 may be lowest and filter life may be longest when both drainage layers 13 and 14 have substantially the same edgewise flow resistance. Therefore, regardless of whether the drainage layers 13 and 14 are made of the same material, they are preferably selected so as to have substantially the same resistance to edgewise flow. For ease of manufacture, it is convenient to use identical materials for both drainage layers 13 and 14, thereby assuring the same edgewise flow resistance through both drainage layers.

Alternatively, the upstream and downstream drainage layers 13 and 14 may have different characteristics and these characteristics may be varied to provide a desired effect. For example, where the thickness of the filter composite is fixed, e.g. in order to fix the surface area of the filter medium within an envelope, the thickness of the upstream drainage layer may be greater than the thickness of the downstream drainage layer. This may provide greater cake space on the upstream side of the filter medium, but it may sacrifice even flow distribution on the downstream side of the filter medium.

The filter composite forming the filter element 10 may include other layers in addition to the filter medium 12 and the drainage layers 13 and 14. For example, in order to prevent abrasion of the filter medium due to rubbing contact with the drainage layers when the pleats expand and contract during pressure fluctuations of the fluid system in which the filter is installed, a cushioning layer can be disposed between the filter medium and one or both of the drainage layers. The cushioning layer is preferably made of a material smoother than the drainage layers and having a higher resistance to abrasion than the filter medium 12. For example, when the drainage layers are made of an extruded nylon mesh, an example of a suitable cushioning layer is a polyester non-woven fabric such as that sold under the trade designation Reemay 2250 by Reemay Corporation.

The layers forming the filter element 10 can be formed into a composite by conventional filter manufacturing techniques, either prior to or simultaneous with corrugation.

In the prior art, in order to ensure adequate drainage in a filter element with closely spaced pleats, it was necessary to form large surface irregularities, such as grooves, in the surfaces of the pleats in order to create drainage passageways. These grooves, typically formed by a method such as embossing, greatly reduced the volume of a filter element which was available for filtration. In the present invention, the drainage layers can provide adequate drainage even when in intimate contact with one another, so large surface irregularities in the pleats are not necessary. Therefore, each of the layers in the filter composite forming the filter element 10 may have a substantially flat surface.

The core 20 supports the inner periphery of the filter element 10 against forces in the radial direction and also helps to give the filter axial strength and rigidity against bending. The core 20 may be of conventional design and may be made of any material having sufficient strength and which is compatible with the fluid being filtered. Openings are formed through the wall of the core 20 to permit the passage of fluid between the outside and the center of the core 20.

When the filter element 10 is being subjected to outside-to-inside fluid flow, the presence of a core 20 is usually desirable. However, depending upon the forces acting on the filter element 10 during filtration, it may be possible to omit the core 20. For example, when fluid flow through the filter element 10 is primarily from the inside to the outside thereof, radially inward forces on the filter element 10 may be absent or so low that a core 20 becomes unnecessary, enabling a reduction in the weight of the filter.

A filter according to the present invention preferably includes means for retaining the pleats of the filter element 10 in a laid-over state. In the present embodiment, this means comprises the outer cage 30 which surrounds the filter element 10. The cage 30 may be of conventional design with openings formed therein for the passage of fluid. The material of which the cage 30 is made can be selected based on the fluid being filtered and the filtering conditions.

Usually, a filter according to the present invention will be equipped with end caps 40 (only one of which is shown in FIG. 1) at one or both ends of the filter element 10. The end caps 40 can be either blind or open end caps, and the material of which they are formed and their shape can be selected in accordance with the filtering conditions and the materials of the members to which the end caps are to be joined. Preferably, the end caps 40 are attached to the filter element 10, but they may also be attached to the core 20 or the cage 30. Conventional techniques can be used to attach the end caps to the filter element 10, such as by use of an epoxy, by polycapping (as taught, for example, in U.S. Pat. No. 4,154,688), or by spin welding.

Figure 4:
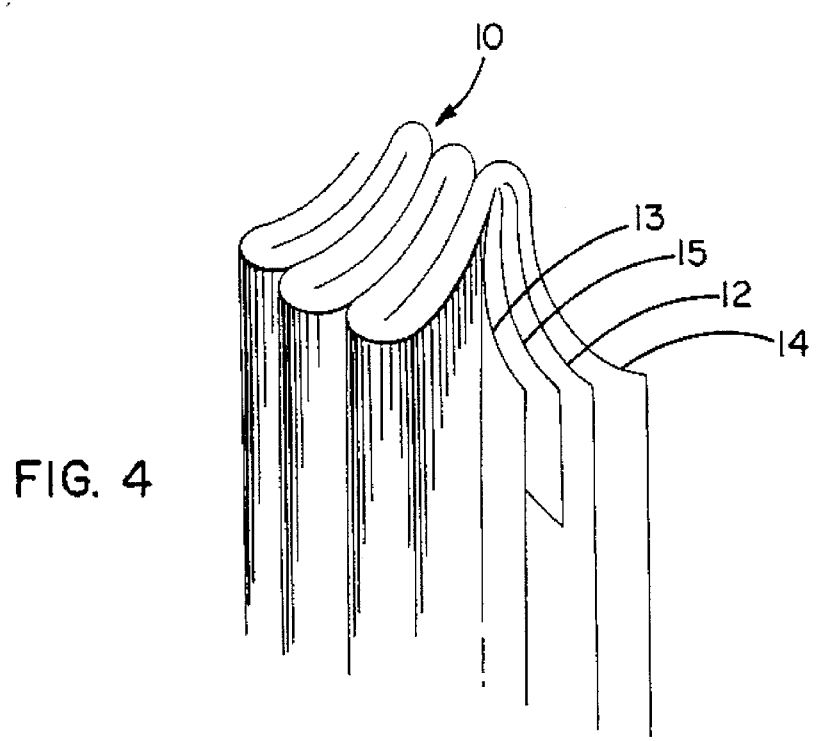
FIG. 4 is a schematic perspective view of a portion of a filter composite having an insert strip at one end.

In order to prevent leakage of fluid at the ends of the filter element 10, it is desirable to obtain a good seal between the end caps 40 and the end surfaces of the filter element 10 so that fluid is prevented from passing through the end surfaces of the filter element 10. However, it may be difficult to obtain a good seal when the filter element 10 and the end caps 40 are made of materials having poor affinity for one another. In such cases, an insert in the form of a strip of material having a good affinity for the end cap material can be corrugated into the ends of the filter element 10. FIG. 4 schematically illustrates a portion of a filter element having an insert 15 corrugated between two of the layers of the filter composite. When the end caps 40 are attached, the insert 15 enables the creation of a good seal between both ends of the filter element 10 and the end caps 40. For example, when the end caps are made of a fluoropolymer, a strip of another fluoropolymer, such as a fluorinated ethylene-propylene (FEP) resin, can be corrugated into the ends of the filter element 10 as the insert 15. The insert 15 need only be wide enough to bond the filter medium to the end cap, and therefore, as shown in FIG. 4, it normally extends for only a portion of the axial length of the filter element 10. A typical width for the insert 15 is approximately 0.5 inches.

The filter element 10 illustrated in FIG. 1 can be manufactured by a variety of techniques. In one technique, the filter composite is first corrugated to form a corrugated sheet, cut to a suitable length or suitable number of pleats, and then formed into a cylindrical shape. The lengthwise edges of the corrugated sheet are then sealed to each other by conventional means to form a cylindrical filter element 10. The pleats of the filter element 10 are then laid over as the filter element 10 is inserted into a cage 30. After the filter element 10 has been fit into the cage 30, a core 20 is inserted into the hollow center of the filter element 10, and then end caps 40 are attached to the ends of the filter element 10 to form a completed filter.

Figure 5:
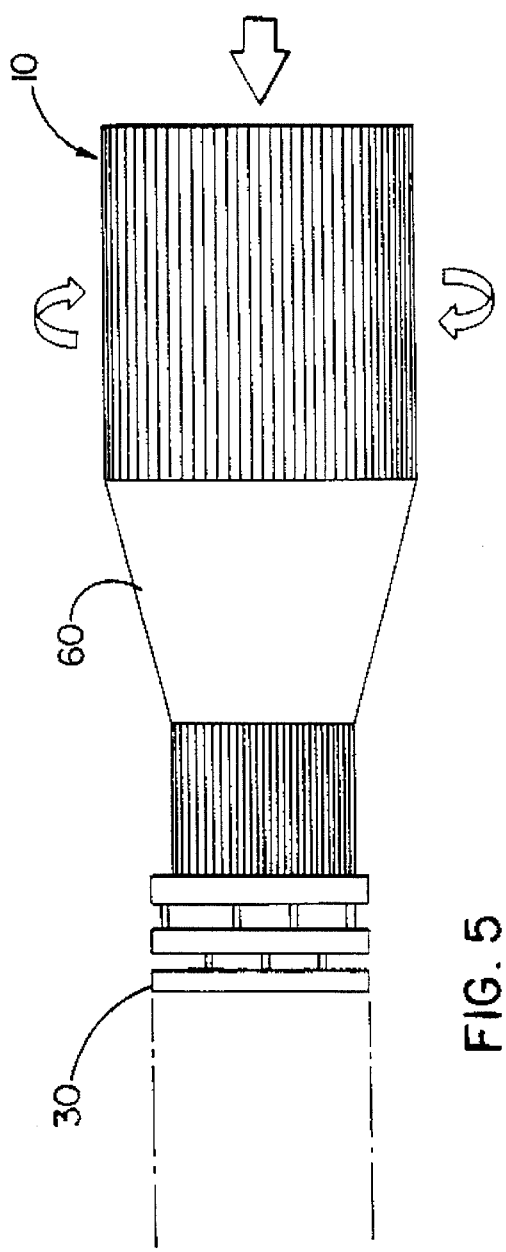
FIG. 5 schematically illustrates one method of forming the pleats of a filter element into a laid-over state.

FIG. 5 illustrates one method of laying over the pleats. In this method, the filter element 10 is inserted lengthwise into the mouth of a funnel-shaped tool 60 having an exit (the left end in FIG. 5) adjoining a cage. As the filter element 10 is pushed into the tool 60, it is simultaneously twisted, either by hand or by machine, thereby causing the pleats to lay over against one another. The dimensions of the tool 60 are selected so that at the exit, the filter element 10 has an outside diameter small enough for the filter element 10 to slide into the cage 30.

It is also possible to form the pleats of a corrugated sheet 10 into a laid-over state before forming the pleats into a cylindrical form. For example, after the filter composite is passed through a corrugator to form a substantially planar corrugated sheet, the sheet can be pressed between two flat surfaces to flatten the sheet and cause the pleats to lay over against one another. The thus flattened corrugated sheet can then be bent into cylindrical form and the ends of the sheet sealed to one another to form a cylindrical filter element 10.

It may be easier to lay over the pleats of the filter element 10 if there is a smooth radius on the outside pleat crest as opposed to a sharp crease. One method of creating a smooth radius is to place a disposable layer of paper, referred to as a strip-out paper, on the downstream side of the filter corrugated composite during corrugation. The strip out paper becomes part of the pleats and produces a desired smooth radius. The strip-out paper is then stripped off the composite after the completion of corrugation and before the composite is formed into a cylinder. The material used for the strip-out paper is not critical. An example of a suitable material is a smooth paper. The thickness of the strip-out paper can be selected based on the desired bending radius of the corrugated composite, taking into consideration the thickness of the other layers of the composite.

Another technique for manufacturing the filter element 10 allows the formation of pleats in which the adjoining legs have slightly different lengths. For many filter elements, especially those formed from a multilayer composite, it is easier and more reliable to form the filter element into a laid-over state if the adjoining legs of each pleat have slightly different lengths. Such pleats will be referred to as pleats with unequal legs.

Preferred embodiments of a pleating method and apparatus according to this aspect of the present invention will now be described with reference to FIGS. 6–11, which schematically illustrate one cycle in a pleating method of the present invention. As shown in these figures, pleats are formed atop a support, such as a planar pleating table 100, by a pleater member and a stripper member. In accordance with one aspect of the invention, the pleats are formed between surfaces of the pleater member and the stripper member which are curved or extend at an acute angle from the pleating table 100, preferably substantially less than 90° more preferably within the range from about 15° to about 75°, and most preferably within the range from about 30° to about 60°, e.g., 45°. For example, the pleater member may be a wedge-shaped member referred to as a pleating wedge 101 and the stripper member may be a thin plate referred to as a stripper knife 102. The pleating wedge 101 can be raised and lowered with respect to, and moved back and forth parallel to, the top surface of the pleating table 100, while the stripper knife 102 can be raised and lowered with respect to the pleating table 100. For convenience, the surface of the pleating table 100 is usually level, but a level surface is not necessary for the method of the present invention.

The material 103 to be pleated may be dispensed onto the pleating table 100 by any suitable means, such as a reel 104. The material 103 may be a single sheet or layer, or it may be a composite of a plurality of layers, such as a filter medium and one or more drainage layers. The layers may be formed into a composite prior to being stored on the reel 104, or the individual layers may be stored on separate reels and simultaneously fed to the pleating table 100 so that the composite is formed as the layers are pleated.

As shown in the figures, the front surface 101a of the pleating wedge 101 and the rear surface 102a of the stripper knife 102 (the surface which opposes the pleating wedge 101) are both sloped with respect to the pleating table 10 by similar but not necessarily equal acute angles. It is because these surfaces extend at acute angles, or because they are curved, that the method of the present invention is able to form pleats having adjoining legs of unequal lengths.

Figure 6:
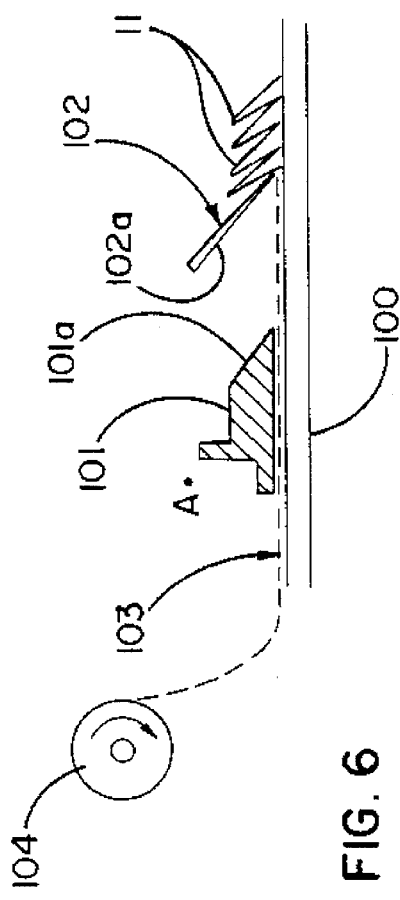
FIGS. 6–11 are schematic views illustrating a method and apparatus for forming a filter element.

FIG. 6 illustrates the start of the pleating cycle, in which the pleating wedge 101 is located at a point A in the figure. At this position, the front surface 101a of the pleating wedge 101 is spaced from the rear surface 102a of the stripper knife 102 by a predetermined distance which depends upon the height of the pleats which are to be formed. The lower surface of the pleating wedge 101 is in frictional contact with the material 103 to be pleated, and the lower edge of the striper knife 102 is pressed against the material 103 to be pleated so as to restrain it.

Figure 7:
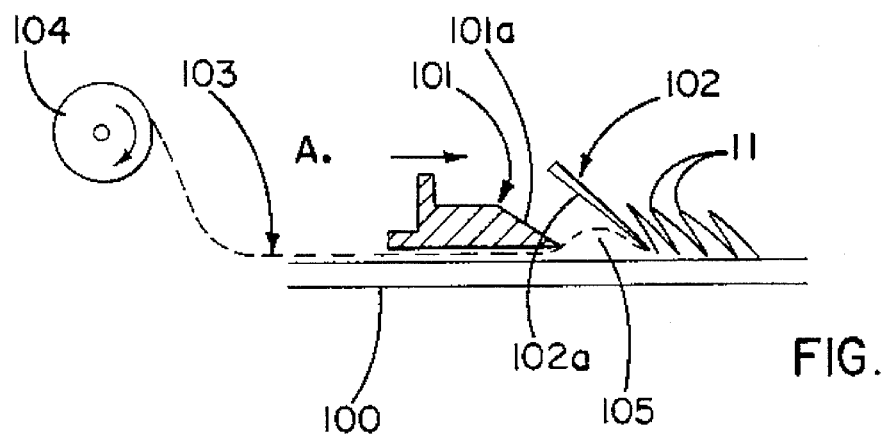

The pleating wedge 101 is then moved from point A towards the stripper knife 102 in the direction of the arrow in FIG. 7 while the lower surface of the pleating wedge 101 remains in frictional contact with the material 103 to be pleated. At the same time, the stripper knife 102 is maintained stationary. Due to the frictional contact between the pleating wedge 101 and the material 103 to be pleated, the movement of the pleating wedge 101 towards the stripper knife 104 causes the portion of the material 103 disposed between the pleating wedge 101 and the stripper knife 102 to bend upwards from the surface of the pleating table 100 in the form of a bulge 105.

Figure 8:
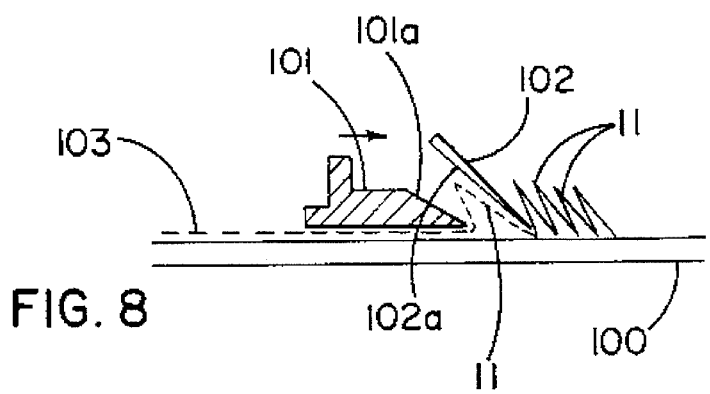
Figure 9:
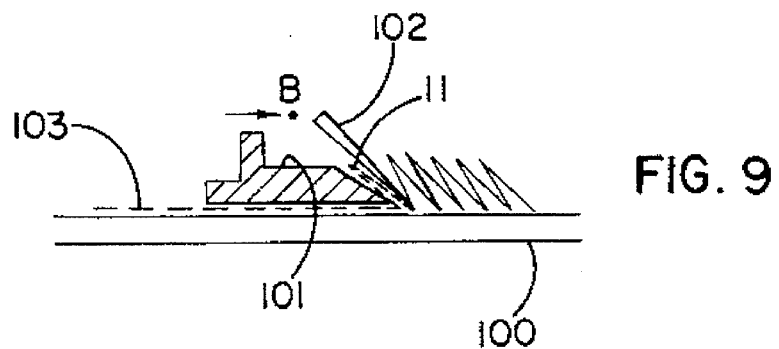

As the pleating wedge 101 is moved still closer to the stripper knife 102, the bulge 105 in the material 103 to be pleated begins to fold into the shape of a pleat 11, as shown in FIG. 8. The pleating wedge 101 is advanced further to a point B in FIG. 9, in which the material 103 is compressed between the front surface 101a of the pleating wedge 101 and the rear surface 102a of the stripper knife 102, thereby forming a single pleat 11.

Figure 10:
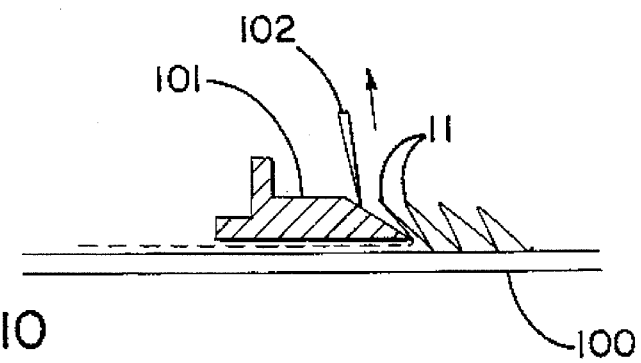
Figure 11:
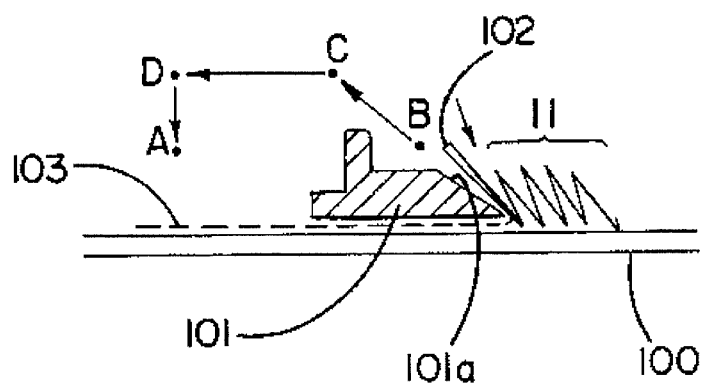

The stripper knife 102 is then raised from the pleating table 100 and simultaneously pivoted in the clockwise direction in the figures. As the stripper knife 102 rises, its rear surface 102a slides along the pleat 11 which was just formed, further pressing the pleat 11 against the front surface 101a of the pleating wedge 101. When the rear surface 102a of the stripper knife 102 clears the upper end of the pleat 11, the rear surface 102a of the stripper knife 102 may then contact the front surface 101a of the pleating wedge 101, as shown in FIG. 10. The stripper knife 102 is then lowered, and its rear surface 102a slides along the front surface 101a of the pleating wedge 101 between the pleating wedge 101 and the pleat 11 just formed until the lower edge contacts the material 103 to be pleated, as shown in FIG. 11. During the raising and lowering of the stripper knife 102, the pleating wedge 101 may be maintained substantially stationary.

Next, while the stripper knife 102 is maintained stationary, which in turn holds the material 103 stationary, the pleating wedge 101 is returned to point A to complete the pleating cycle. The path of the pleating wedge 101 as it travels from point B back to point A is such that the lower surface of the pleating wedge 101 is raised above the surface of the material 103 to be pleated so that the material 103 will not be pulled backwards. For example, the pleating wedge 101 can be moved along a path with straight sides indicated as B-C-D-A in FIG. 11. Alternatively, the pleating wedge 101 can move along an arcuate path in going from point B to point A. Upon the wedge 101 returning to point A, the above process is repeated.

Each time the cycle illustrated in FIGS. 6–11 is performed, a new pleat 11 is formed, and it is moved by the stripper knife 102 to the right to join the pleats 11 which have already been formed and which accumulate on the right side of the stripper knife 102 in the figures. The entire group of completed pleats 11 is incrementally pushed to the right by the movement of the stripper knife 102. Any desired number of pleats can be formed by repeating the above-described cycle a corresponding number of times. The group of completed pleats may be conveniently rolled off the end of the pleating table 100.

Figure 12:
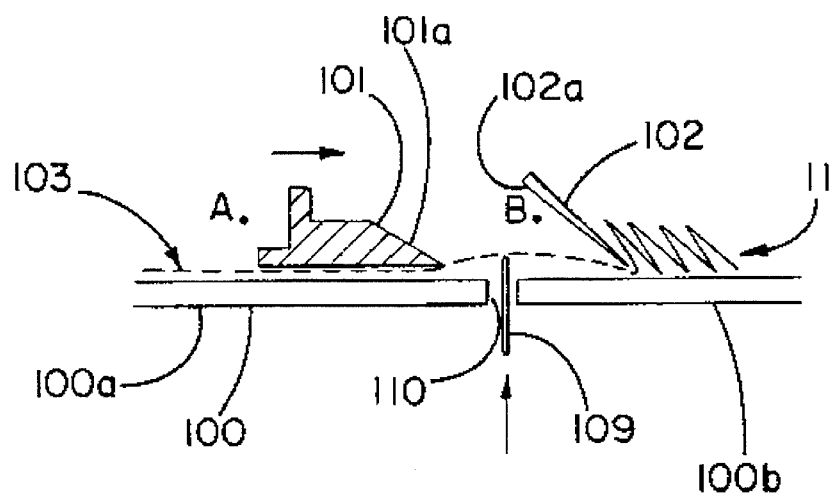
FIGS. 12 and 13 are schematic views illustrating another method and apparatus for forming a filter element.
Figure 13:
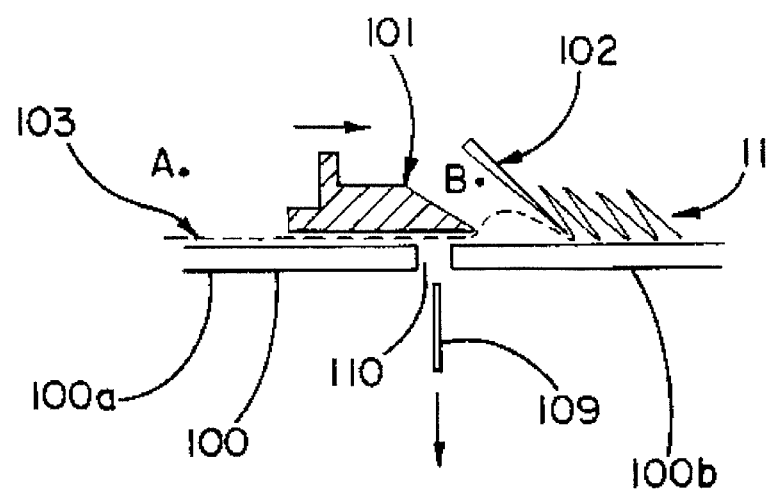

FIGS. 12 and 13 are schematic illustrations showing the operation of a creaser bar 109. These figures are analogous to FIGS. 6–11 except the pleating apparatus further includes a creaser bar 109 which moves up and down through a gap 110 in the pleating table 100. In these figures, as the pleating wedge 101 begins to move toward point B from point A, the creaser bar 109 is made to protrude through the gap 110 in the pleating table 100 and above the surface of the pleating table 100. When the creaser bar 109 protrudes above the surface of the pleating table 100, it contacts the material 103 and forces the material 103 to bulge upwards properly, e.g., without any wrinkles. The upper edge of the creaser bar may also form a crease in the material which may become the crest or root of the pleat. As the pleating wedge 101 moves closer to point B, the creaser bar 109 is retracted beneath the surface of the pleating table 100 so that the pleating wedge 101 can pass over the gap 110 in the pleating table 100. The pleating process is otherwise the same as described with respect to FIGS. 6–11.

Figure 14:
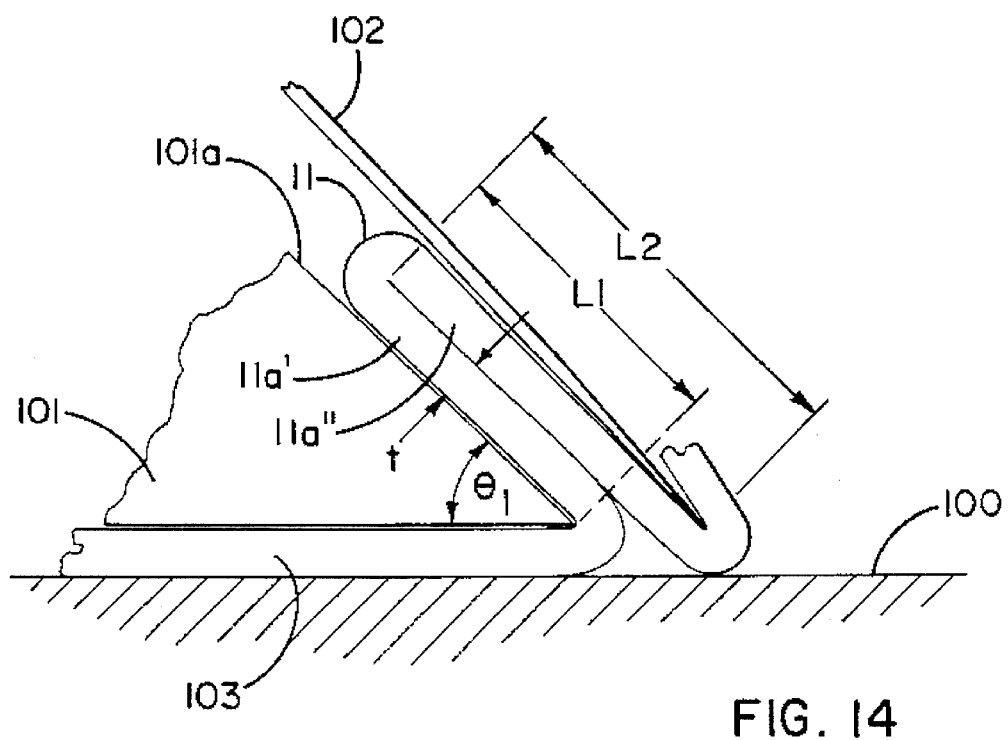
FIG. 14 is an enlarged side view of one of the pleats of FIG. 9.

FIG. 14 is an enlarged view of a pleat 11 which can be formed by the processes illustrated in FIGS. 6–13. The pleat has two legs 11a', 11a", one of which contacts the front surface 101a of the pleating wedge 101 and the other of which contacts the rear surface 102a of the stripper knife 102. Because the front surface 101a of the pleating wedge 101 is sloped with respect to the pleating table 100 by an acute angle, the length L1 of the leg 11a' contacting the front surface 101a of the pleating wedge 101 may be shorter than the length L2 of the adjoining leg 11a" of the same pleat 11, wherein the lengths may be measured between the points where the material 103 being pleated is folded back upon itself. If the front surface 101a of the pleating wedge 101 is sloped with respect to the surface of the pleating table 100 by an angle $\theta_1$ and the thickness of the material 103 to be pleated is t, then the difference between the lengths L1 and L2 of adjoining legs 11a', 11a" is approximately $L2-L1=2 t/\tan\theta_1$. The difference in length can be set to a desired value by suitably selecting the angle of the pleating wedge 101. Due to the difference in length, pleats formed by the method of the present invention can be easily formed into a laid-over state.

Figure 16:
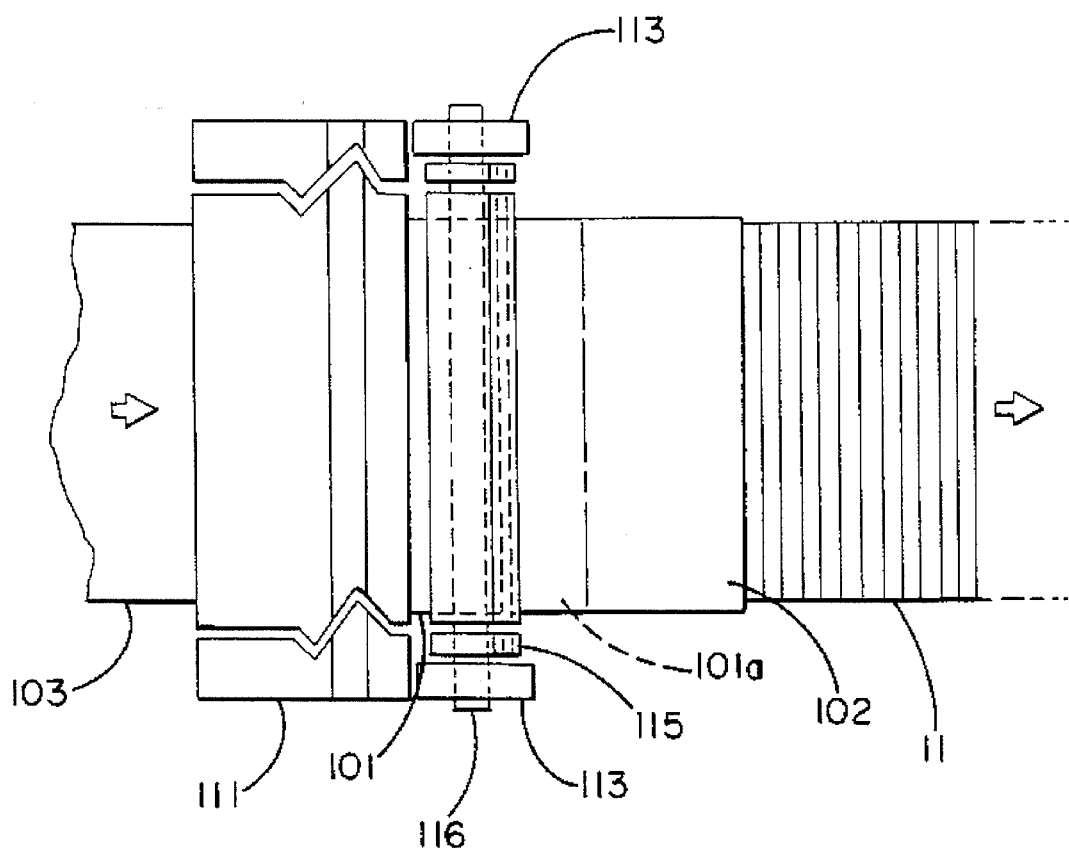
FIG. 16 is a plan view of the pleating apparatus of FIG. 15.
Figure 15:
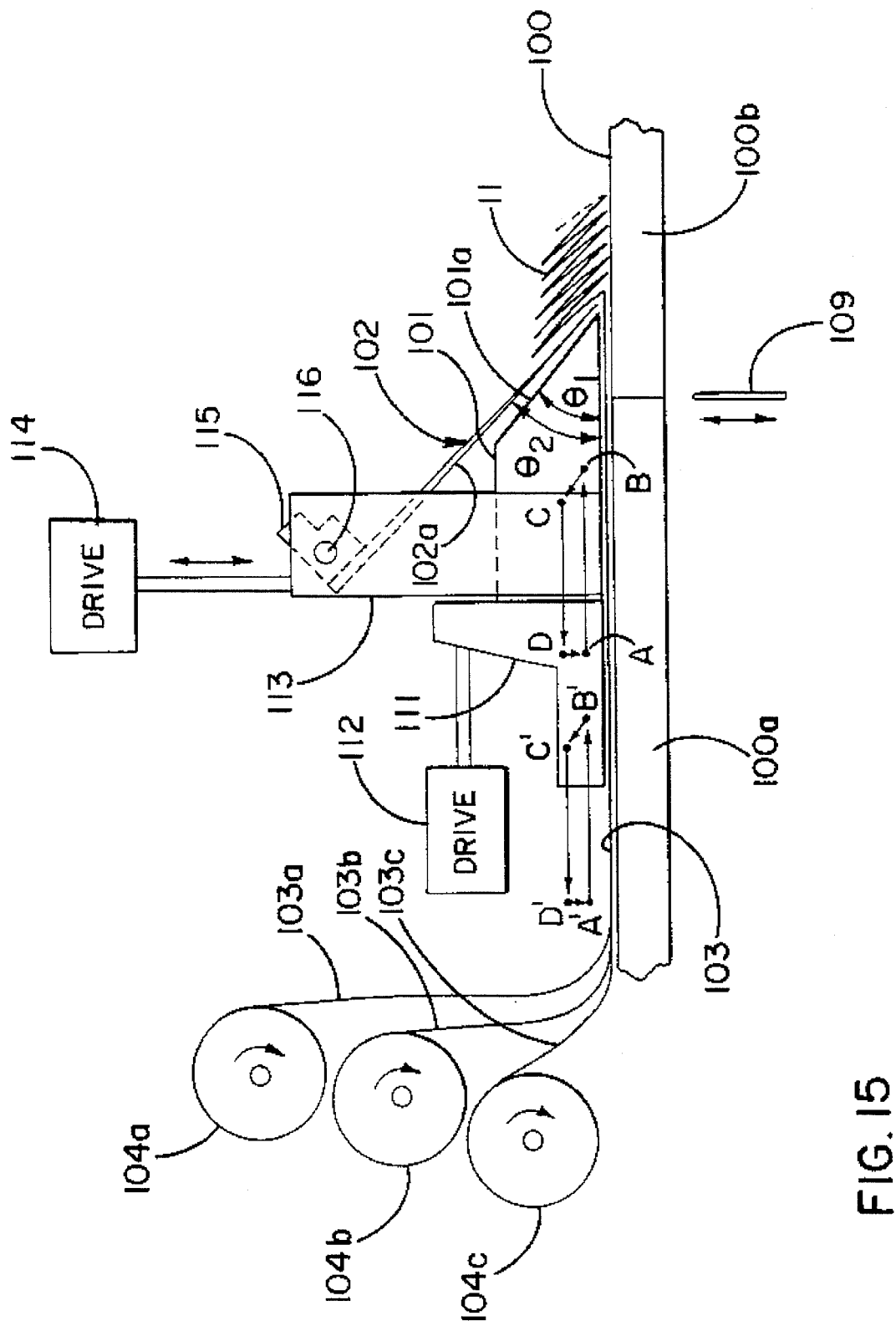
FIG. 15 is a side view of a pleating apparatus.

Many of the components of a pleating apparatus according to the present invention are similar to those of commercially available push bar type pleating machines, such as a Model No. 10148 pleating machine manufactured by Chandler Machine Company of Ayer, Mass. Pleating is performed atop a pleating table 100, as shown in FIGS. 15 and 16. In a typical pleating machine, the pleating table 100 has two sections 100a and 100b which can be moved with respect to each other in the horizontal direction to form a gap of a desired size between the two sections. When the movable sections 100a and 100b are separated by a gap, the creaser bar 109 can be moved up and down in the gap by an unillustrated drive mechanism to assist in the pleating process. If the creaser bar 109 is not employed, the two sections 100a and 100b of the pleating table 100 are made to abut, or the pleating table 100 can be made in one piece and the creaser bar can be omitted.

In the embodiment of FIG. 15, the material being pleated is a filter composite 103 of three different layers 103a, 103b, 103c dispensed onto the pleating table 100 from three different reels 104a, 104b, 104c, respectively. The layers 103a, 103b, 103c can be made of the same or different materials. In this example, the material 103b on the middle reel 104b is a filter medium, while the materials 103a and 103c on the top and bottom reels 104a and 104c are extruded meshes which serve as drainage layers for the upstream and downstream surfaces of the filter medium 103b.

The pleating apparatus is equipped with a bar which has a generally L-shaped cross section and which is referred to as a pusher bar 111. The pusher bar 111 is movably disposed atop the pleating table 100 so as to move along a closed path, at least one portion of which extends parallel to the surface of the pleating table 100. In this embodiment, the pusher bar 111 is driven along a four-sided closed path, indicated by points A'-B'-C'-D' in FIG. 15, by a drive mechanism 112. While a pusher bar 111 need not be employed in a pleating apparatus according to the present invention, the pusher bar 111 and its associated drive mechanism 112 serve as a convenient means of driving a pleating wedge 101.

The pleating wedge 101 is rigidly secured to the front end of the pusher bar 111 by bolts or other suitable means so that the two move together as a single unit. In accordance with one aspect of the present invention, the pleating wedge 101 has a front surface 101a having a constant acute angle of slope $\theta1$ with respect to the surface of the pleating table 100. Preferably, at least the front surface 101a of the pleating wedge 101 has a width which is substantially the same as or greater than the width of the filter composite 103.

As the pusher bar 111 moves along the path A'-B'-C'-D', the pleating wedge 101 moves along the path A-B-C-D. The pleating wedge 101 has a lower surface which preferably extends parallel to the pleating table 100. As the pusher bar 111 travels along leg D'-A' of the path, the lower surface of the pleating wedge 101 is lowered into frictional contact with the filter composite 103 being pleated. As long as the pleating wedge 101 is in frictional contact with the filter composite 103, it is possible for the lower surface of the pusher bar 111 to be spaced from the filter composite 103 as the pusher bar 111 moves along leg A'-B'. In other words, the lower surface of the pusher bar 111 need not be flush with the lower surface of the pleating wedge 101. The horizontal stroke of the pusher bar 111, i.e., the distance along leg A'-B', may be readily adjustable, so the height of the pleats, which depends upon the stroke length, can be set at a desired value. As the pusher bar 111 rises along leg B'-C' and travels backwards along leg C'-D', the pleating wedge 101 travels along leg B-C and leg C-D, and the lower surface of the pleating wedge 101 is raised above the filter composite 103 by the drive mechanism 112 and the pusher bar 111 so that the filter composite 103 will not be pulled backwards by the pleating wedge 101.

A stripper knife 102 is pivotably mounted on reciprocating members commonly referred to as sliders 113. The sliders 113 are disposed on opposite widthwise sides of the pleating wedge 101 and are raised and lowered along a vertical path by a drive mechanism 114. The timing of the movement of the sliders 113 and the pusher bar 111, as well as the creaser bar 109 during the operation of this embodiment can be controlled by a conventional mechanical or electrical controller which is coupled to the respective drive mechanisms 112, 114. The stripper knife 102 preferably comprises a thin blade having a width which is substantially the same as or greater than the width of the filter composite 103. The upper end of the stripper knife 102 is secured to a bar, referred to as a stripper bar 115, which is pivotably supported on the sliders 113 by a pins 116 attached to between the two sliders 113. The lower end of the stripper knife 102 extends to close proximity of the pleating table 100 so as to be able to restrain the composite 103 from movement and the lower end of the stripper knife 102 may be tapered to assist in separating completed pleats from the front surface 101a of the pleating wedge 101. The stripper bar 115 is biased in the clockwise direction in the figure by an unillustrated biasing member, such as a spring, so that the stripper knife 102 is biased towards the front surface 101a of the pleating wedge 101. Alternatively, the pivot axis of the stripper bar can be chosen so that the weight of the stripper knife will exert a clockwise torque on the stripper knife about the rod and thereby bias the stripper knife towards the pleating wedge. The stripper bar 115 is prevented from rotating in the counterclockwise direction past the position shown in FIG. 15 by an unillustrated stopping member, such as a pin.

In the illustrated embodiment, the rear surface 102a of the stripper knife 102, which opposes the front surface 101a of the pleating wedge 101, is planar. In accordance with another aspect of the present invention, when the stripper knife 102 is in the position shown in FIG. 15, the rear surface 102a has a constant acute angle of slope θ2 with respect to the surface of the pleating table 100 which is close to the angle of slope θ1 of the front surface 101a of the pleating wedge 101. The slope of the rear surface 102a of the stripper knife 102 may be slightly smaller than or equal to, but is preferably slightly larger than, e.g., about 5° larger than, the slope of the front surface 101a of the pleating wedge 101, so that a wedge-shaped space is formed between the pleating wedge 101 and the stripper knife 102. This wedge-shaped space assists in forming pleats with unequal legs.

Figure 17:
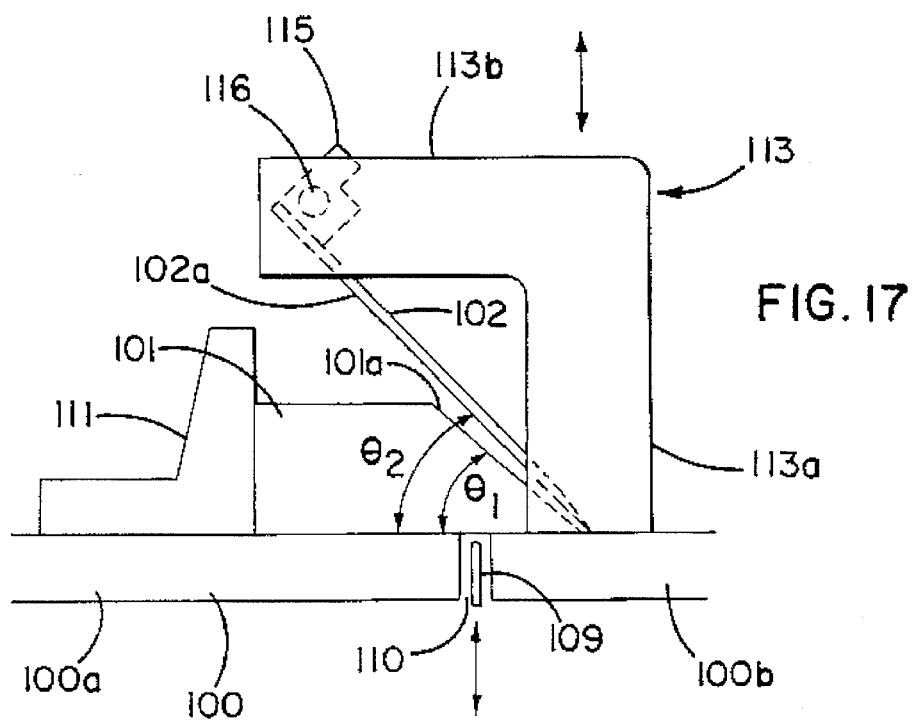
FIG. 17 is a side view of another pleating apparatus.

FIG. 17 illustrates a portion of another pleating apparatus embodying the present invention, which is analogous to the pleating apparatus shown in FIGS. 15 and 16. As in the previous embodiment, a stripper knife 102 is secured to a stripper bar 115, which is pivotably supported through a rod 116 by two sliders 113 disposed on opposite widthwise sides of a pleating wedge 101. Each slider 113 in this embodiment has generally the shape of an L with a first leg 113a extending upwards from the surface of the pleating table 100 and a second leg 113b extending generally parallel to the pleating table 100. The stripper bar 115 is pivotably mounted on the second legs 113b so as to be in the same location with respect to the pleating wedge 101 as the stripper bar 115 of the embodiment of FIG. 15. The first leg 113a of each slider 113 is spaced from the location of the sliders 113 of FIG. 15 so as not interfere with the movement of the creaser bar 109. The two sections 100a, 100b of the pleating table 100 are separated from one another to provide a gap 110 therebetween large enough for the creaser bar 109 to pass through. The creaser bar 109 can be raised and lowered by an unillustrated drive mechanism, as previously described. The creaser bar 109 has a width which is substantially the same as or greater than the width of the filter composite 103 being pleated. The structure and operation of this embodiment are otherwise analogous to those of the embodiment of FIGS. 15 and 16.

In the preceding embodiments, the opposing surfaces of the pleating wedge and the stripper knife are both generally planar, so the legs of each pleat formed between the opposing surfaces are substantially straight. However, when a pleated filter element is formed into a laid-over state in a cylindrical configuration, the individual pleats generally take on a curved shape as viewed in a transverse cross section, with each leg of a pleat extending along an arc from the inner to the outer periphery of the filter element. It is therefore easier to lay over the pleats of a filter element if the pleats are formed with a curved profile at the time of pleating.

Figure 18:
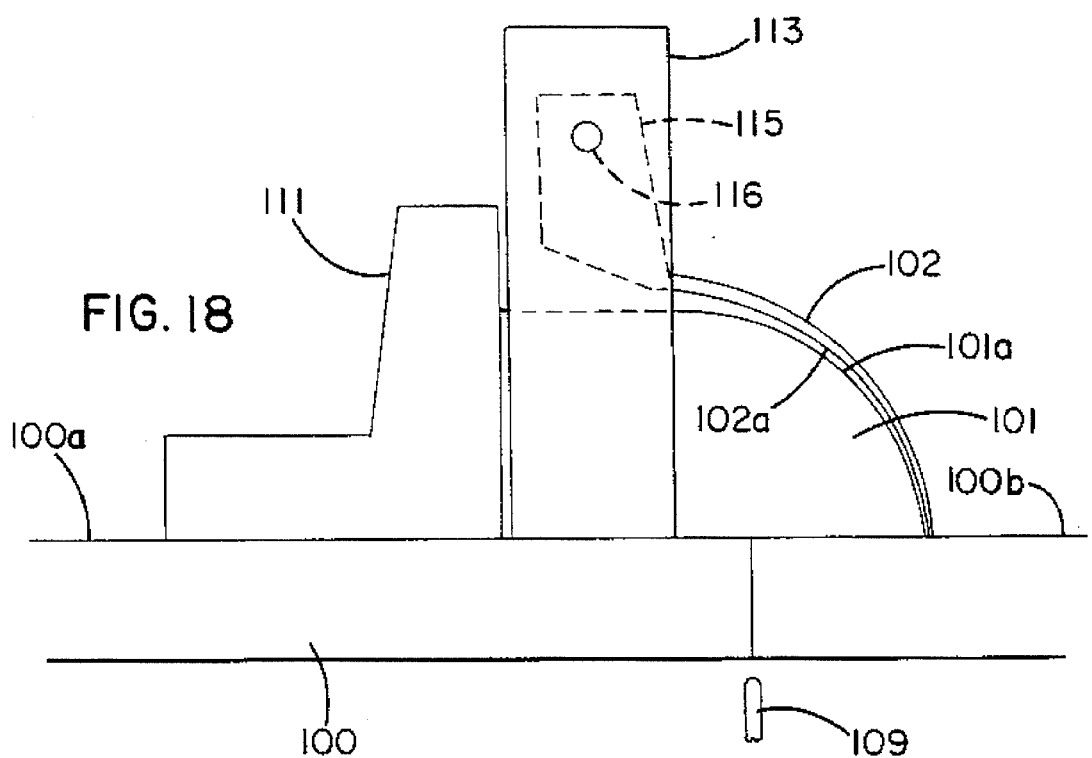
FIG. 18 is a side view of another pleating apparatus.

FIG. 18 illustrates another embodiment of the present invention capable of manufacturing curved pleats, including curved pleats having unequal legs. In this embodiment, the opposing surfaces 101a, 102a of the pleating member 101 and the stripper knife 102 are both curved in at least the portions which contact the filter composite during pleating. While a variety of curves, regular or irregular, are suitable for the opposing surfaces, in the illustrated embodiments the surfaces have an arcuate shape. The pleating member 101 has a front surface 101a with a radius of curvature which is preferably smaller than that along the rear surface 102a of the stripper knife 102 so that the two surfaces 101a, 102a are separated by a space that increases in size with increasing distance from the surface of the pleating table 100. This space assists in forming pleats with unequal legs. In the illustrated embodiment, the stripper knife 102 is pivotably mounted on a slider 113 which is analogous to the slider 113 of FIG. 15, the two sections 100a, 100b of the pleating table 100 abut, and the creaser bar 109 is maintained in an inoperative position beneath the pleating table 100. Pleating is performed using the embodiment of FIG. 18 in essentially the manner illustrated in FIGS. 6–13, e.g., a filter composite is pressed between the curved surfaces 101a, 102a of the pleating member 101 and the stripper knife 102 to form pleats having curved legs, preferably of unequal length, which can be easily formed into a cylindrical laid-over state.

After the filter composite has been pleated by the method of the present invention, the pleated filter composite which emerges from the pleating apparatus is cut to a prescribed length or prescribed number of pleats determined by the intended dimensions of the filter element. The pleated filter composite is then formed into a cylindrical shape, and the lengthwise edges of the pleated filter composite are sealed to each other by conventional means to form a cylindrical pleated filter pack. The pleats of the filter pack are then formed into a laid-over state in which the opposing surfaces of adjoining legs of the pleats contact each other over a substantial portion of the height of the pleats. Because the pleats have curved legs and/or unequal legs, the formation of the cylindrical, pleated filter pack into a laid-over state is greatly facilitated.

Figure 19:
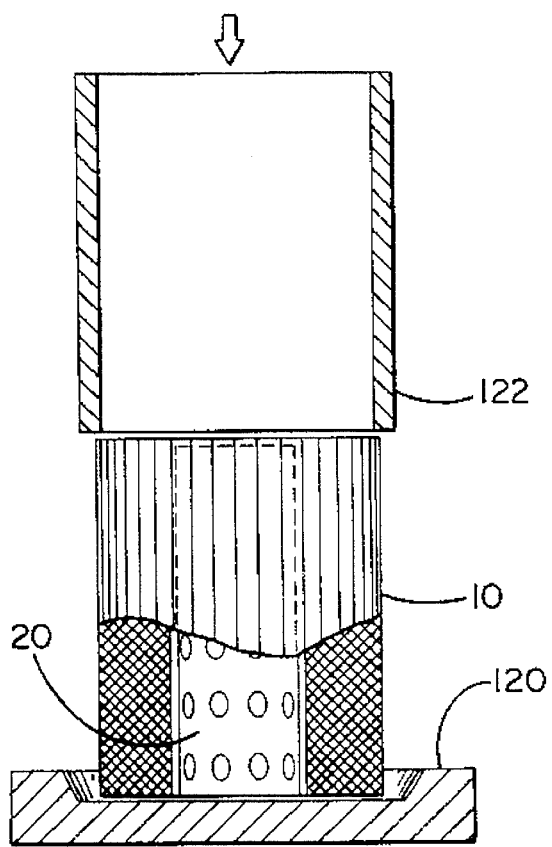
FIGS. 19–21 are schematic views illustrating a method and apparatus for assembling a filter element.
Figure 20:
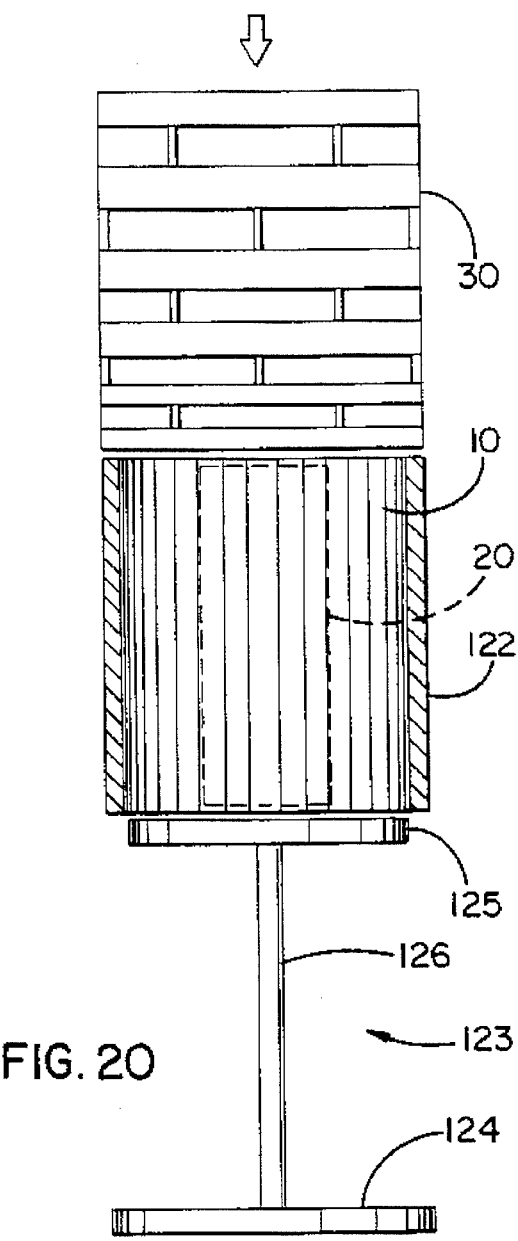
Figure 21:
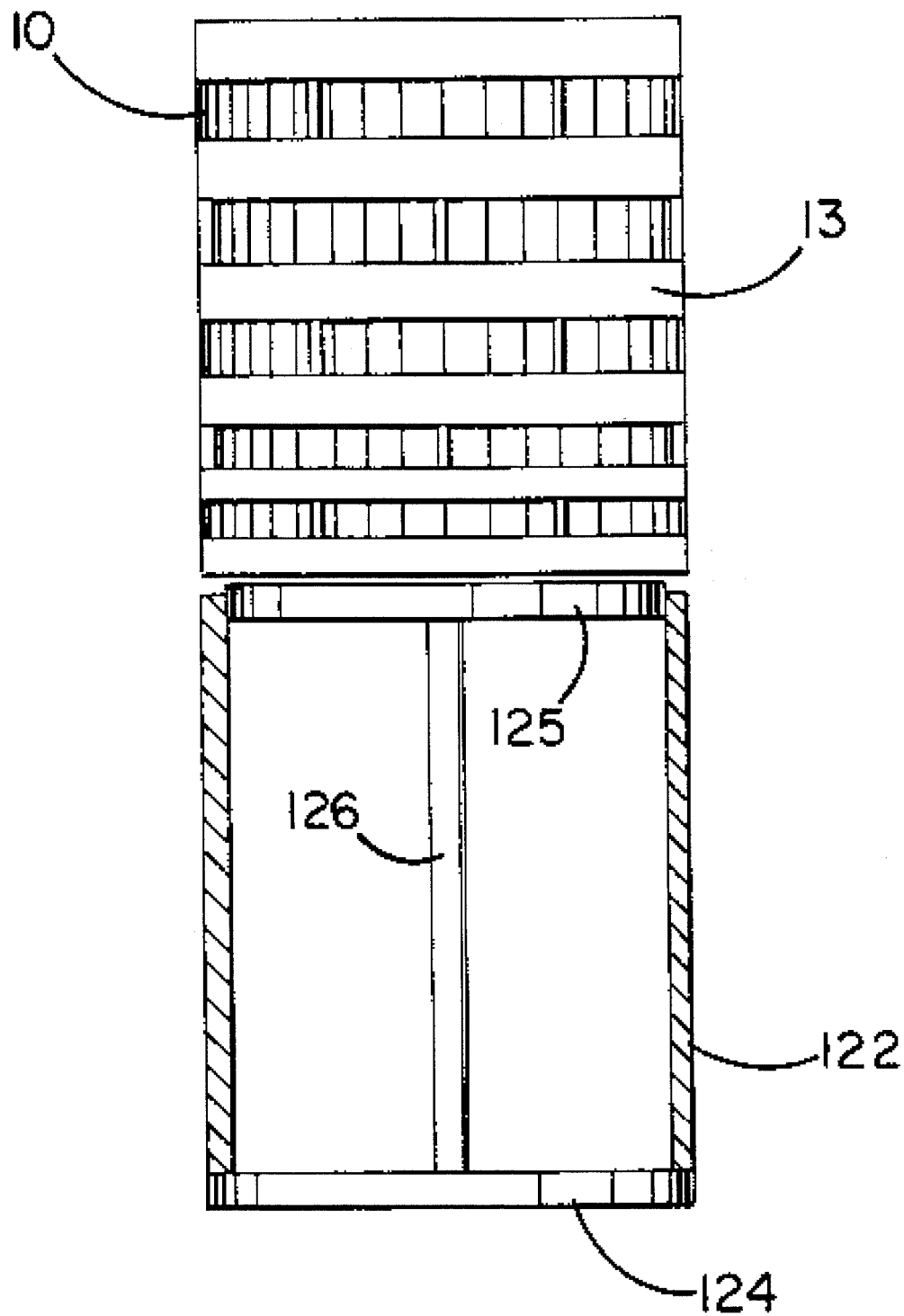

FIGS. 19–21 illustrate one suitable method of forming the cylindrical pleated filter element into a laid-over state. A conventional perforated cylindrical core 20 is disposed on a chuck 120, and a cylindrical pleated filter element 10 having pleats formed by the method of the present invention is disposed loosely over the core 20 as shown in FIG. 19. A tubular member 122 having an inner diameter which corresponds to the desired outer diameter of the laid-over filter element 10 is placed on the upper end of the filter element 10 and pressed downwards as shown by the arrow in FIG.

19. The pleats of the filter element 10 are loosely packed prior to being laid over, and the pleats at the upper end of the filter element 10 can usually be easily compressed so as to fit into the lower end of the tubular member 122. As the tubular member 122 is pressed downwards over the filter element 10, the pleats of the filter element 10 are laid over against each other until the outer diameter of the filter element 10 matches the inner diameter of the tubular member 122.

When the entire length of the tubular member 122 has been fit over the filter element 10, the tubular member 122, the laid-over filter element 10, and the core 20 are removed from the chuck 120 as a single unit and disposed on another chuck 123, as shown in FIG. 20. This chuck 123 has a lower base 124 supporting an upper base 125 by means of a connecting rod 126. The upper base 125 may be disk shaped and preferably has a diameter smaller than the inner diameter of the tubular member 122 but larger than the inner diameter of the laid-over filter element 10. A conventional perforated cylindrical cage 30 having an inner diameter corresponding to the desired outer diameter of the laid-over filter element 10 is then placed atop the tubular member 122 and pressed downwards in the direction of the arrow in FIG. 19. The filter pack 121 is prevented from moving downwards by the upper base 125 of the chuck 123, but the tubular member 122 is free to move, so the downwards force exerted on the cage 30 causes it to slide over the laid-over filter element 10 and in the process displace the tubular member 122. The cage 30 is pushed downwards until its lower end reaches the upper base 125 and the tubular member 122 is completely separated from the filter element 10, as shown in FIG. 20. The assembly comprising the core 20, the laid-over filter element 10, and the cage 30 can then be removed from the chuck 123 and subjected to further processing, such as the installation of end caps on one or both ends by conventional end capping techniques.

Filter elements according to the present invention have a far greater surface area usable for filtration than conventional pleated filter elements for the same inner and outer diameter. For example, for a filter element having longitudinal pleats as shown in FIGS. 2 and 3, the total surface area A of the filter element is given by the formula $$A = 2hNL \tag{1}$$

wherein
h is the height of the pleats,
N is the number of pleats in the filter element, and
L is the length of the pleats measured in the axial direction of the filter element.

In a pleated filter element in which adjacent pleats contact one another along the inner diameter of the filter element, the number of pleats N is approximately given by $$N = \frac{\pi(d+2t)}{2t} \tag{2}$$

wherein t is the thickness of the composite (filter medium+drainage layers+other layers).

In a conventional filter element without laid-over pleats, the pleat height is given by the formula $$h = \frac{(D-d)}{2} \tag{3}$$

wherein
D is the outer diameter of the filter element, and
d is the inner diameter of the filter element.

In contrast, in a filter element with laid-over pleats such as shown in FIG. 2 in which the opposing surfaces of adjoining legs of the pleats are in intimate contact over substantially the entire pleat height, the maximum pleat height $h_{max}$ which can be achieved is approximated by the formula $$h_{max} = \frac{D^2 - d^2}{4(d + 2t)} \tag{4}$$

In an actual filter with laid-over pleats, the height of the pleats will be less than the maximum pleat height $h_{max}$ because, for example, of the difficulty of forming the pleats into perfectly knife-edged pleats. However, the actual pleat height is preferably at least 80% and more preferably at least 90% of $h_{max}$ so as to make optimal use of the volume between the inner and outer diameters of the filter element.

Using these formulas, it is possible to calculate the increase in filtering area provided by the filter of the present invention. For a filter element having a length L of 10 inches, a composite thickness t of 0.175 inches, an inner diameter d of 1.2 inches, and an outer diameter D of 2.75 inches, the number N of pleats is given by Equation (2) as $$N = \frac{\pi \cdot (1.2 + 0.35)}{0.35} = 13$$

The pleat height for a conventional filter and the maximum pleat height for a filter according to the present invention are given by Equations (3) and (4), respectively as $$h_{(conventional\ filter)} = \frac{(2.75 - 1.2)}{2}$$
$$= 0.775\ \text{inches}$$

$$h_{max(laid\text{-}over\ pleats)} = \frac{(2.75^2 - 1.2^2)}{4(1.2 + 0.35)}$$
$$= 1.239\ \text{inches}$$

Plugging these values into Equation (1) gives the following surface areas, wherein $A_{max}$ is the maximum possible surface area corresponding to a pleat height of $h_{max}$:

A(conventional filter)=2×0.775×13×10=201.5 in²

Amax (laid-over pleats)=2×1.239×13×10=322.14 in².

Thus, in this example, the maximum possible filter surface area of a filter according to the present invention having laid-over pleats is approximately 60% greater filter surface area than a conventional pleated filter with the same inner and outer dimensions. Even if the actual height of the laid-over pleats is only 80% of $h_{max}$, the actual filter surface area will still be 322.14×0.80=257.71 in², which is 28% higher.

The increased surface area of a filter element with laid-over pleats according to the present invention increases the useful life of the filter element compared with a conventional filter element having the same inner and outer dimensions.

Furthermore, having the pleats in a laid-over state results in the pleats being uniformly supported and acts to distribute concentrated loads evenly across the filter element. This minimizes pleat movement and increases the ability of the pleats to retain particles in pulsating flow system. In addition, when the pleats are in a laid-over state, the end surfaces of the filter element are extremely compact and provide greater resistance to damage of the filter medium during the installation of end caps on the filter element.

The pressure drop ΔP across a pleated filter element having upstream and downstream support and drainage layers is given by the following equation:

$$\Delta P = (K_c h + K_m/2h) \cdot (\mu Q/Nl) \tag{5}$$

wherein
 μ=absolute viscosity of fluid being filtered
 Q=volumetric flow rate of fluid
 $K_e$=edgewise flow resistance factor of support and drainage material
 $K_m$=flow resistance factor of filter medium
 h=pleat height
 l=pleat length in axial direction of filter
 N=number of pleats.

If all of the factors in Equation (5) are constant except for the pleat height h, then the pressure drop ΔP will be a minimum when the pleat height h is expressed by the following equation:

$$h=(K_m/2K_e)^{1/2} \qquad (6)$$

Thus, in situations in which the outer diameter of the filter element can be chosen at will, the pressure drop ΔP across a filter according to the present invention can be minimized and the efficiency of the filter can be maximized by choosing the outer diameter so that the pleat height h satisfies Equation (6).

Figure 22:
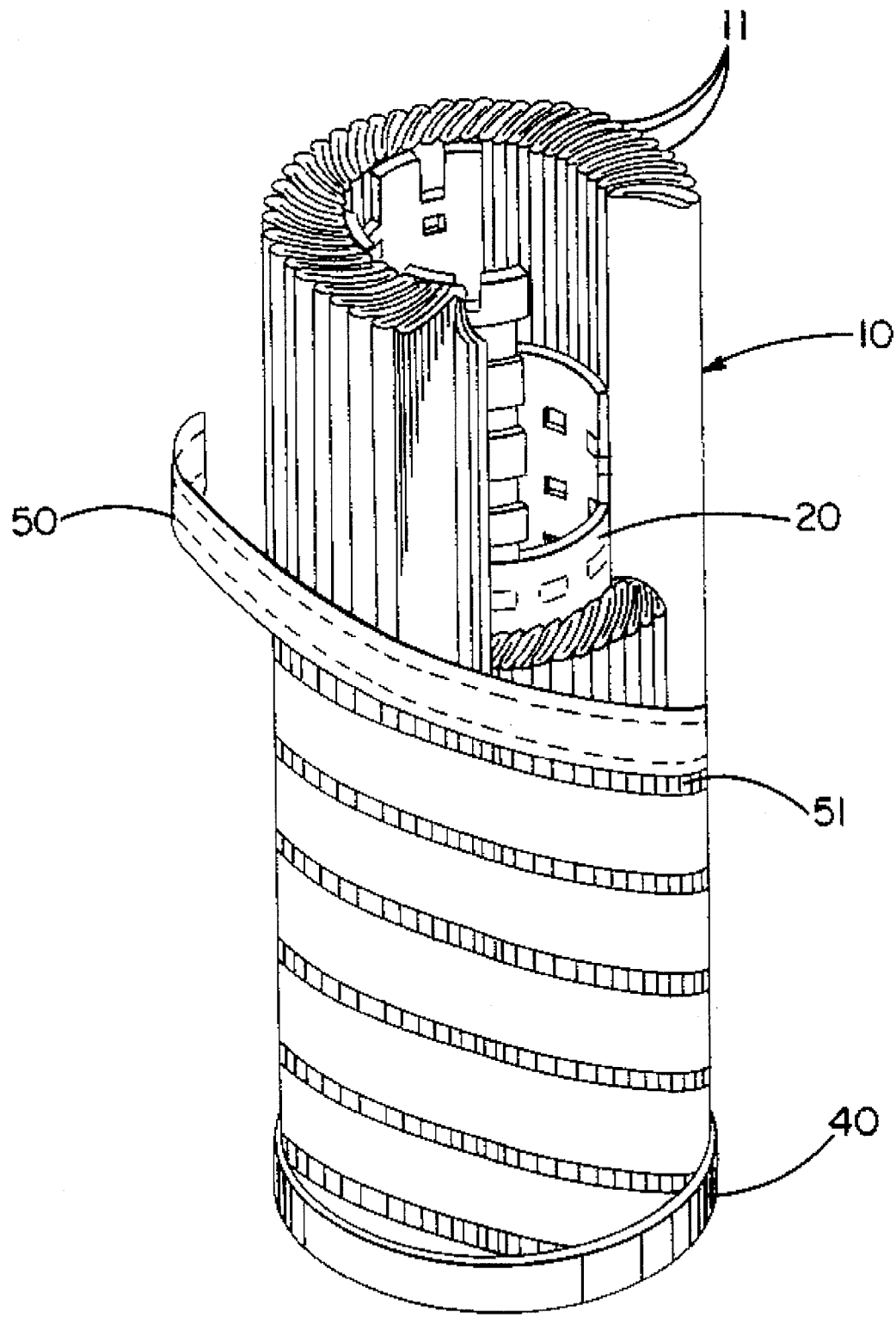
FIG. 22 is a cut-away perspective view of another filter.

Means other than a cage can be used to retain the pleats in a laid-over state. For example, the cage could be replaced by a plurality of unconnected rings fitting over the filter element 10 so as to prevent the pleats from unfolding. Another suitable means of retaining the pleats is a sheet of material wrapped around the filter element with sufficient tension to prevent the pleats from unbending from a laid-over state. FIG. 22 is a cutaway view of a second embodiment of the present invention in which the cage of FIG. 1 is replaced by a helical wrap member 50 comprising a parallel-sided strip of a flexible material which is helically wrapped about the filter element 10 in a plurality of turns. The wrap member 50 can be made of any material which is compatible with the fluid being filtered. If the wrap member 50 completely envelops the outer periphery of the filter element 10, the wrap member 50 is preferable porous. For many application, a porous, polymeric, non-woven material available from Reemay Corporation under the trade designation Reemay is suitable. Laminates of the Reemay material can also be employed. Examples of other suitable materials are oil board paper and mylar film.

The wrap member 50 may be a relatively thin material not intended to resist large stresses, so it would be primarily suitable for use when the filter element 10 is being subjected to outside-to-inside flow. In this case, the wrap member 50 only need be strong enough to maintain the pleats in a laid-over state and to resist radially outward forces occurring during momentary reversals of flow direction of fluid through the filter element 10. Alternatively, the wrap may be formed from a stronger material which resists the relatively larger stresses associated with inside-to-outside flow. The tension of the wrap member 50 can be selected in accordance with the expected filtering conditions.

The wrap member 50 can be wrapped around the filter element 10 with or without overlap between adjacent turns of the wrap member 50. For example, adjacent turns of the wrap member 50 can abut each other with substantially no overlap, or by employing an overlap, it is possible to wrap multiple layers of the wrap member 50 around the filter element 10. However, it has been found that if the wrap member 50 includes unobstructed openings, the dirt capacity of the filter element 10 can be greatly increased compared to that of an unwrapped pleated filter element or compared to a pleated filter element completely enveloped in a wrap member. The openings may be holes formed in the material of the wrap member 50 itself, or they may be gaps left between adjacent turns of the wrap member 50. In the embodiment of FIG. 22, the wrap member 50 is wrapped around the filter element 10 so as to leave openings in the form of a helical gap 51 between adjacent turns.

To prevent the wrap member 50 from becoming loaded, the size of the openings of the wrap member 50 should be large enough to allow the passage of virtually all of the particles contained in the fluid being filtered. Furthermore, the total area of the openings is generally less than 50% of the total surface area of the cylindrical surface defined by the peaks of the pleats 11 of the filter element 10. More preferably, the total area of the openings is in the range from about 6% to about 30% of the total area of the surface defined by the peaks of the pleats 11.

The wrap member 50 is preferably secured in a manner which prevents it from becoming unwound from the filter element 10. One method of securing the wrap member 50 is to attach it to the filter element 10 by a bonding agent, such as a hot melt adhesive, which is applied to the wrap member 50 as it is wound around the filter element 10. The bonding agent can be applied to the wrap member 50 in the form of a continuous or intermittent bead which spirals around the filter element 10 parallel to the edges of the wrap member 50. Alternatively, if the wrap member 50 is made of a polymeric material, it may be fusion bonded to the filter element 10 by a hot wheel which travels down the length of the filter element 10 as the filter element 10 is rotated. The wrap member 50 can be attached directly to the filter element 10, or if there is overlap between adjacent turns of the wrap member 50, the adjacent turns can be attached directly to one another. It is also possible to wrap the wrap member 50 around the filter element 10 without directly attaching the two together, and to secure only the portions of the wrap member 50 adjoining the end caps 40 by means of the end caps 40 or by other mechanical means such as crimping.

A wrap member 50 is usually wrapped around a cylindrical filter element by disposing the filter element on a mandrel and rotating the mandrel and the filter element while applying the wrap member to the filter element. The pleats of the filter element can be deformed into the laid-over state at the time of wrapping by use of a funnel-shaped tool 60 like that illustrated in FIG. 5. As the mandrel is rotated, the tool 60 can be advanced in the lengthwise direction of the filter element. As the pleats emerge from the exit of the tool 60, they will be in a laid-over state, and the wrap member 50 can be wrapped around the pleats in this state.

The wrap member 50 is not limited to a single strip of material. For example, the wrap member 50 may comprise two strips of material wrapped around the filter element 10 in a double helix. Alternatively, the wrap member 50 could be wrapped around the filter element 10 in the circumferential direction rather than the helical direction.

A number of examples of pleated filter elements according to the present invention are listed below. The components of each filter element are listed from the upstream to the downstream side of the element.

| Element A - Cylindrical element inside an external cage | |
| --- | --- |
| Upstream drainage layer | Nalle extruded polypropylene mesh (NIF.013D 26 × 31) |
| Filter medium | melt-blown tapered-pore polypropylene medium with a 10-micrometer absolute |

| | |
|---|---|
| Downstream drainage layer | removal rating<br>Nalle extruded polypropylene mesh (NIF.013D 26 × 31) |
| Number of pleats = 63 | Pleat height = .600 in. |
| Cage I.D. = 2.60 in. | Core O.D. = 1.8 in. |

Element B - Cylindrical element inside an external cage

| | |
|---|---|
| Upstream drainage layer | Nalle extruded polypropylene mesh (NIF.013D 26 × 31) |
| Prefilter | melt-blown tapered-pore polypropylene medium with a 10-micrometer absolute removal rating |
| Filter medium | melt-blown polypropylene medium with a 6-micrometer absolute removal rating |
| Downstream drainage layer | Nalle extruded polypropylene mesh (NIF.013D 26 × 31) |
| Number of pleats = 58 | Pleat height = .650 in. |
| Cage I.D. = 2.60 inches | Core O.D. = 1.8 in. |

Element C - Cylindrical element inside an external cage

| | |
|---|---|
| Upstream drainage layer | Nalle extruded polypropylene mesh (NIF.020S 16 × 16) |
| Prefilter | fibrous depth filter made of thick polypropylene fibers and a 90-micrometer absolute removal rating |
| Filter medium | fibrous depth filter made of thick polypropylene fibers. About .080 inches thick. 20-micrometer absolute removal rating |
| Downstream drainage layer | Nalle extruded polypropylene mesh (NIF.020S 16 × 16) |
| Number of pleats = 24 | Pleat height = .830 in. |
| Cage I.D. = 2.45 in. | Core O.D. = 1.3 in. |

Element D - Cylindrical element with a helical wrap

| | |
|---|---|
| Upstream drainage layer | Nalle extruded nylon mesh (NIF.020S 15 × 15) |
| Cushioning layer | Reemay 2250 non-woven polyester |
| Filter medium | glass fiber medium with a 6-micrometer absolute removal rating on a non-woven polyester substrate |
| Downstream drainage layer | Nalle extruded nylon mesh (NIF.020S 15 × 15) |
| Helical wrap | Reemay 2024 non-woven polyester attached to filter element with polyamide hot melt beads |
| Number of pleats = 63 | Pleat height = .750 in. |
| Core O.D. = 1.875 in. | Element O.D. = 3.02 in. |

Element E - Cylindrical element with a helical wrap

| | |
|---|---|
| Upstream drainage layer | Nalle extruded nylon mesh (NIF.020S 15 × 15) |
| Cushioning layer | Reemay 2250 non-woven polyester |
| Filter medium | glass fiber medium with a 12-micrometer absolute removal rating on a non-woven polyester substrate |
| Downstream drainage layer | Nalle extruded nylon mesh (NIF.020S 15 × 15) |
| Helical wrap | Reemay 2024 non-woven polyester attached to filter element with polyamide hot melt beads |
| Number of pleats = 40 | Pleat height = .530 in. |
| Core O.D. = 1.123 in. | Element O.D. = 1.93 in. |

Element F - Cylindrical element inside an external cage

| | |
|---|---|
| Upstream drainage layer | Reemay 2011 non-woven polyester |
| Upstream filter medium | nylon membrane with a 0.2-micrometer absolute removal rating |
| Downstream filter medium | same as upstream medium |
| Downstream drainage layer | Reemay 2011 non-woven polyester |
| Number of pleats = 127 | Pleat height = .86 in. |
| Cage I.D. = 2.65 in. | Core O.D. = 1.4 in. |

Element G - Cylindrical element inside an external cage

| | |
|---|---|
| Upstream drainage layer | PTFE non-woven with an FEP binder |
| Filter medium | UP00 series membrane (PTFE membrane available from Sumitomo Electric under the trade name Poreflon. Suitable grade) |
| Downstream drainage layer | PTFE non-woven with an FEP binder |
| Number of pleats = 140 | Pleat height = .49 in. |
| Cage I.D. = 2.46 in. | Core O.D. = 1.68 in. |

An FEP strip was corrugated into each end of the filter element to aid in attaching the end caps to the filter element.

In each of the above examples, the opposing surfaces of adjoining legs of the pleats were in intimate contact over the entire axial length of the filter element.

The illustrated embodiments of the present invention are intended for use with outside-in radial fluid flow through the filter element. However, it is also possible to use a filter according to the present invention for inside-out radial flow. A fluid to be filtered, i.e., a liquid or a gas, is directed through the laid-over pleats 11 of the filter element 10 of the filter. The fluid is distributed by the upstream drainage layer 13 along the entire upstream surface of the filter medium 12, even those regions of the filter medium 12 deep within the filter element 10 near the core 20. The fluid then passes through the filter medium 12, filtering the fluid and depositing particulates on or within the filter medium 12. From the downstream side of the filter medium 12, the filtered fluid drains along the downstream drainage layer 14, enters the interior of the perforated core 20, and then exits the filter.

The filter may be cleaned by directing a cleaning fluid in the opposite direction through the filter. The cleaning fluid may be a gas which is blown back through the filter or it may be a liquid which is backwashed through the filter. For example, a backwash liquid, such as water, may be directed from the interior of the perforated core 20 through the laid-over pleats 11 of the filter element 10. The backwash liquid is distributed by the downstream drainage layer 14 along the entire downstream surface of the filter medium 12, even those regions of the filter medium 12 distant from the core 20 near the cage 30 or the wrap 50. The backwash liquid then passes through the filter medium 12, driving the particulates from within the filter medium 12 and/or from the upstream surface of the filter medium 12. The particulates are then flushed through the upstream drainage layer 13 and expelled from the filter with the backwash liquid. The ratio of the amount of backwash liquid flushed through the filter element to the amount of fluid filtered through the filter element may be as much as about 10 and more preferably in the range of about 2 to about 4.

Figure 23:
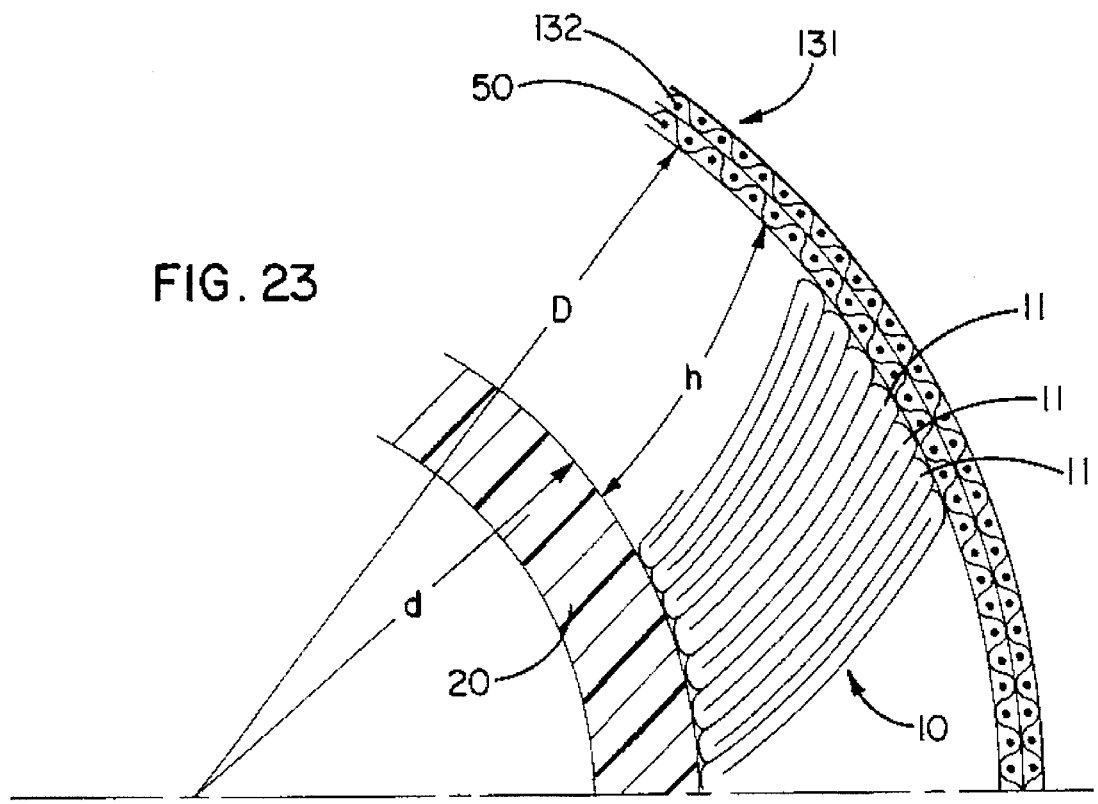
FIG. 23 is a cross-sectional view of a precoat filter.

While filters embodying the present invention are useful in a wide variety of applications, one particularly advantageous use is as a precoat filter. One example of a precoat filter 130 is shown in FIG. 23 and generally comprises a perforated core 20 and a laid-over filter element 10 which may be similar to those of the filter shown in FIG. 1. In addition, the precoat filter 130 comprises a wrap 50 which serves as a septum for holding a precoat layer 131 and a protection member 132 for protecting the precoat layer 131 from erosion.

To support the filter element 10 and the septum 50 against radially directed forces, the core 20 may comprise any sufficiently strong, rigid material which is compatible with the fluid being purified, as previously described. However, while the precoat filter preferably includes a perforated core, the core may be omitted, for example, where the filter element has sufficient structural integrity to withstand the radially directed forces without the core.

The filter element 10 may be a single layer or a multi-layer composite and may comprise any suitable filter medium as well as a drainage means and a cushioning layer, as previously described. For example, where the precoat filter is to be used for nuclear condensate polishing in which the fluid to be purified is water, the filter element 10 may comprise a filter medium sandwiched between an upstream drainage layer and a downstream drainage layer. Each drainage layer may comprise a polypropolene extruded mesh. The filter medium preferably includes a fibrous medium comprising aromatic polyamide fibers, such as those available under the trade designation Kevlar from Du Pont de Nemours E. I. Co., which are fibrillated and resin-bonded to a cellulose or non-woven polymeric substrate forming the downstream side of the medium. The pore size of the filter medium is preferably sufficiently small for the filter medium to be able to capture substantially all of the particulates in the precoat material, so that any fine particles in the precoat material which pass through the septum will be trapped by the filter medium. The pore size of the filter medium may also be small enough to capture additional fines in the fluid to be filtered, fines which may be too small to be intercepted by the precoat layer 131.

The septum 50 preferably comprises a flexible, porous wrap wrapped around and completely covering the outer periphery of the filter element 10, as previously described. Preferably, the septum 50 is sufficiently strong so that it can serve not only as a support for the precoat layer 131 but also as a means for keeping the filter element 10 in a laid-over state, both during filtration (when the precoat filter is subjected to radially inward flow) and during backwashing (when the precoat filter element is subjected to radially outward flow). The septum 50 is also preferably strong enough to resist the radial outward pressures acting on the precoat filter during backwashing. Commonly, these pressures are in the range of approximately 10 psi to approximately 100 psi.

The septum 50 is preferably selected to have a pore size such that it can prevent passage of most of the particles in the precoat material, allowing a cake of precoat material to build up on the upstream surface of the septum. If the smallest particles in the precoat material pass through the septum 50, they can be captured by the filter element 10 which has a very high dirt capacity and therefore does not become clogged by the fine particles. Since the septum 50 does not need to hold all the particles in the precoat material, it can have a porosity which enables it to be used for long periods of time before needing to be cleaned or replaced.

The material of which the septum 50 is made will depend upon the characteristics of the fluid being filtered and of the precoat material. For example, a suitable septum material is a woven mesh of a corrosion resistant metal, such as stainless steel. A variety of weaves are suitable, including a square weave and a Dutch twill weave, with the square weave being the preferable of the two because it is thinner and therefore easier to handle. In other applications, the septum can be a polymeric mesh or a non-woven polymeric fabric. For nuclear condensate polishing, a preferred material for the septum is a 120×180×0.004 (inch)×0.0035 (inch) square weave stainless steel mesh.

The septum can be applied to the filter element in any manner such that all fluid flowing inward through the filter element must first pass through the septum. Preferably, the septum bears against the filter element and more preferably directly contacts the filter element. In the present embodiment, the septum 50 is in the form of a strip with parallel sides which is helically wound around the filter element 10 a plurality of turns over the entire length of the filter element. In order to prevent the precoat material from bypassing the septum 50, adjacent turns of the septum 50 preferably overlap one another. The amount of overlap can be selected based on the desired thickness of the septum 50. For example, by wrapping the septum 50 with an overlap of 50%, a double thickness of the septum 50 can be provided around the filter element 10. The septum 50 need not be in the form of a helical wrap and could instead be wrapped in the circumferential direction of the filter element 10, for example. However, a helical wrap is advantageous in that a septum 50 with a narrow width can be used to wrap a filter element 10 any length. A suitable cutting method such as laser cutting may be used to ensure there are no sharp edges on the septum strip.

The septum 50 is preferably restrained from movement in a manner which prevents it from unwinding from the filter element during normal handling and operation. One method of securing the septum 50 is to attach it to the outer periphery of the filter element 10 a bonding agent, such as a hot melt adhesive, applied to the inner surface of the septum 50 as it is wound around the filter element 10. The bonding agent can be applied to the septum 50 in the form of a continuous or intermittent bead which spirals around the filter element 10 parallel to the edges of the septum 50. Alternatively, if the septum 50 is made of a polymeric material, it may be fusion bonded to the filter element 10 by a hot wheel which travels down the length of the filter element 10 as the filter element 10 is rotated. Instead of or in addition to the septum 50 being attached directly to the filter element 10, if there is overlap between adjacent turns of the septum 50, the adjacent turns can be attached directly to one another by welding or bonding, for example. However, in many cases, it is sufficient to wrap the septum 50 around the filter element 10 without directly attaching the two together and without securing adjacent turns of the septum 50 to one another, and to secure only the end portions of the septum 50 adjoining the axial ends of the filter element 10 by bonding, by fixing the septum 50 to the end caps, or by other mechanical means such as adhesive tape or a metal band such as a stainless steel band.

When the precoat is applied to the precoat filter and when the fluid to be filtered is passed through the precoat filter, fluid flows radially inward through the precoat filter and undergoes a pressure drop as it does so. Due to the pressure drop, a radially inward force acts on the filter element. A conventional pleated element with radially-extending pleats may compress or collapse due to this inwardly directed force. This compression would cause the septum to wrinkle or buckle, and this would cause the precoat layer to crack and break, which is undesirable. However, because the pleats of a precoat filter 130 embodying this aspect of the present invention are laid over on one another the septum 50 may be initially wrapped around the filter element 10 very tightly without damaging the pleats. The denser is the filter element 10 prior to the start of filtration; the smaller is the amount of compression of the filter element 10, the septum 50, and the precoat layer 131 during filtration. Therefore, the septum 50 is preferably wrapped around the filter element 10 with sufficient initial tension that the precoat layer 131 will not crack under the expected operating pressures of the precoat filter. For example, the septum 50 may be wound around the filter element 10 using a tension of up to about 30 pounds or more per inch of width. The initial tension of the septum 50 will depend upon the factors such as the nature of the precoat filter 130 and the operating pressures during filtration. Preferably, the septum 50 is wrapped with an initial tension such that the compression of the diameter of the precoat filter 130 due to the pressure drop across the precoat filter 130 during filtration will be no greater than approximately 5%. Tightly winding the filter element 10 with the septum 50 not only compresses the filter element 10 prior to filtration, but it also prevents movement of the pleats during fluctuations in the pressure across the precoat element, movement which could cause cracking of the precoat layer 131.

Even though adjoining legs of the pleats of the filter element 10 are pressed into intimate contact with one another when the pleats are in a laid-over state, due to the provision of the drainage layers, fluid can easily flow along the upstream and downstream surfaces of the filter medium. Therefore, tightly winding the filter element 10 with the septum 50 does not impair the filtering capability of the precoat filter 130.

The septum 50 may be surrounded by a protective member 132 which acts as a flow straightener to prevent turbulence in the fluid surrounding the precoat filter from eroding the precoat layer 131. The protective member 132 also supports the precoat layer 131 during brief periods during which radially inward flow through the precoat filter 130 is decreased or stopped. The protective member 132 can be made of a variety of materials which are sufficiently porous that the precoat material can readily pass through it. One example of a suitable material for the protective member 132 is a polymeric knit mesh, as disclosed in U.S. Pat. No. 4,904,380, which can be disposed around the septum 50 by various techniques. For example, it can be in the form of a mesh strip wrapped around the septum 50 as a helical wrap, or it can be in the form of a sleeve, either of which may extend completely or only partially along the precoat element.

The precoat filter also comprises end caps which may be fixed to one or more of the core, the laid-over filter element, and the septum in any suitable manner, as previously described. The end caps can be used to secure the ends of the septum 50 and prevent it from unwinding. If the ends of the septum 50 are restrained prior to the installation of the end caps by mechanical restraining members such as tape or bands, the end caps can be installed over the restraining members. Although not shown, the end caps can be equipped with conventional sealing members such as gaskets or O-rings for sealingly connecting the precoat filter to a filtration system in which it is to be employed.

The precoat filter may further include a perforated cage or similar member surrounding the protective member 132 to keep the protective member 132 in place and to give the precoat filter added strength. The cage has openings formed therein which are preferably sufficiently large so as not to obstruct the flow of fluid and produce no significant pressure drop. The cage can have a conventional construction and can be made of any material compatible with the fluid being filtered.

A precoat filter with laid-over pleats is preferable to a conventional pleated filter because it has a much larger surface area than a conventional pleated filter having the same inner and outer dimensions. This means that the precoat filter with laid-over pleats has a longer useful life and can capture fine particles of the precoat layer 131 which pass through the septum 50 for extended periods without fouling.

In addition, because the pleats are laid over, they better resist damage due to the compressive forces generated when the septum 50 is wrapped around the filter element 10 and when the fluid flows through the precoat layer 131 and the precoat filter 130. These forces are spread out along the leg of each laid-over pleat rather than concentrated at the crest of a conventional radially-extending pleat. Consequently, the septum 50 may be wrapped more tightly around a laid-over filter element 10 and the laid-over filter element 10 can withstand greater precoat pressure differentials without damage than a conventional pleated filter.

Furthermore, having the pleats in a laid-over state results in the pleats being uniformly supported and acts to distribute concentrated loads evenly across the precoat filter. This minimizes pleat movement and increases the ability of the pleats to retain particles in pulsating flow systems. In addition, when the pleats are in a laid-over state, the end surfaces of the filter element are extremely compact and provide greater resistance to damage of the filter medium during the installation of end caps on the ends of the filter pack.

The precoat layer 131 is usually applied to the septum 50 after the precoat filter has been installed in a filtration system. The precoat material may be selected in accordance with the fluid which is being filtered, and a precoat filter according to the present invention is not restricted to use with any particular type of precoat material. In a condensate polishing system for a nuclear power plant, the precoat material frequently comprises ion exchange resins. Alternatively, the precoat material may comprise any other suitable material, such as diatomaceous earth. The thickness of the precoat layer 131 will depend upon the desired filtration characteristics and/or ion exchange characteristics. The precoat layer 131 can be applied to the septum 50 by any suitable method, such as those commonly used in existing filtration systems employing precoat filters. For example, a slurry containing the precoat material may be directed outside-in through the precoat filter 130 until a sufficient cake is deposited on the septum 50 and within the protection member 132.

With the precoat layer 131 on the septum 50, the fluid to be filtered, typically a liquid, may be passed through the precoat layer 131, the septum 50, and the filter element 10. The precoat layer 131 may serve both to remove particulates, e.g., by trapping the particulates within the precoat layer 131, and to remove impurities, e.g., by means of ion exchange or sorption. The filter element 10 may serve to capture small particles of the precoat layer 131 which become dislodged from the precoat layer 131 and pass through the septum 50. Further, the pleated filter element 10, with its large surface area, may have a small enough pore size to remove fines from the fluid to be filtered which would otherwise pass through the precoat layer 131 and the septum 50. Thus, the pleated filter element may have a pore rating which is smaller than the pore rating of the precoat layer or the septum.

The precoat layer 131 can be removed from the septum 50 by backwashing when it becomes depleted or so clogged with particulate matter that the pressure drop across the septum 50 or the filter element 10 is unacceptably high. Backwashing is accomplished by passing a backwash fluid, such as water, through the precoat filter in the opposite direction from during filtration, e.g., inside-out through the precoat filter, as previously described. The protective member 132 is sufficiently porous that the precoat layer 131 can be readily dislodged from it and then suitably disposed of. Again, due to the provision of the drainage layers, backwash fluid can readily flow along the upstream and downstream surfaces of the filter medium even with the septum 50 tightly wrapped around the filter element 10. Consequently, the flow rate, pressure, and other parameters of the backwash fluid during backwashing can be those commonly used with conventional precoat filters. The backwashing may be carried out at set time intervals, or it may be carried out whenever the pressure drop across the precoat filter 130 during the filtering operation has reached a predetermined level indicating that the filter element 10 or the septum 50 has become clogged. The backwashing serves not only to remove the precoat layer 131 from the septum 50 but also to clean the filter element 10 by dislodging particles from within the filter element 10. After the precoat layer 131 has been removed by backwashing, a fresh precoat layer 131 can be applied in the same manner as the original precoat layer 131, and the precoat element can again be used for filtration.

A precoat element according to the present invention is not restricted to one having laid-over pleats, and it is possible to wrap the septum around a conventional pleated element having radially-extending pleats not in a laid-over state with the septum bearing against and preferably directly contacting the pleats. However, radially-extending pleats have a low buckling strength, and the septum must be wrapped around such a pleated element fairly loosely to prevent buckling. As a result, during the filtering operation, the pleats may undergo relative movement or may compress in response to the differential pressure across the precoat layer, which can result in deformation of the septum with accompanying cracking of the precoat layer. Nevertheless, in applications in which only a small pressure drop occurs across the precoat filter during filtration and the pleats undergo little relative movement, it may be possible to wrap the septum around the conventionally pleated element with a sufficiently low tension to enable a conventional pleated element to be employed as a precoat element.

Figure 24:
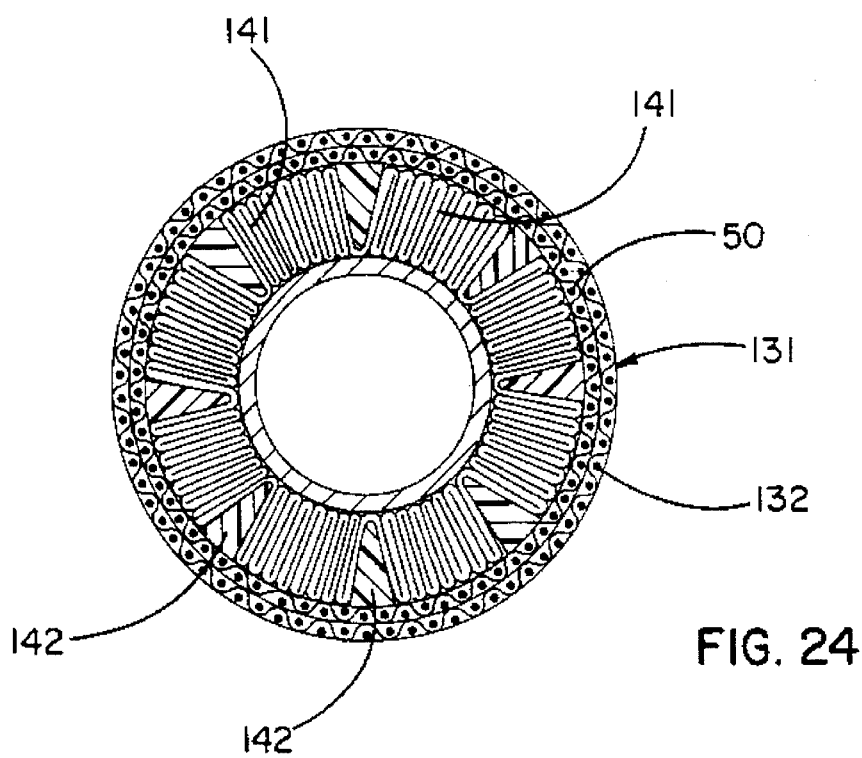
FIG. 24 is a cross-sectional view of another precoat filter.

FIG. 24 illustrates a second precoat filter 140 in accordance with the present invention. To overcome the weakness of conventional radially-extending pleats, the pleats of the filter element 10 are formed into a plurality of groups 141, each containing a plurality of pleats and adjacent groups 141 of pleats are separated by wedge-shaped support members 142. A filter element having pleats grouped by wedge supports is described in detail in U.S. Pat. No. 4,154,688. The second precoat filter 140 further comprises end caps and a septum 50 wrapped around the filter element 10 and may include a protection member 132, as previously described. Further, the second precoat filter 140 may be precoated and backwashed as previously described.

The wedge supports 142 of the second precoat filter 140 rigidify the pleats so the septum 50 may be tightly wound around the filter element 10 and the second precoat filter 140 can withstand large pressure differentials. However, the wedge supports 142 decrease the available filtration area, so the second precoat filter 140 is less preferred than the first precoat filter 130.

What is claimed is:

1. A filter comprising:
   a cylindrical filter element having a longitudinal axis, first and second end surfaces, and a plurality of longitudinal pleats, each of the pleats having a pair of legs, each of the legs having a first and a second surface, the pleats being in a laid-over state in which the first surface of one leg of one pleat is in intimate contact with the first surface of an adjoining leg of said one pleat and the second surface of said one leg is in intimate contact with the second surface of an adjoining leg of an adjacent pleat over substantially the entire height of each leg and over a continuous region extending for at least approximately 50% of the axial length of the filter element; and
   a first impervious end cap connected to the first end surface of the filter element.

2. A filter as claimed in claim 1 wherein the filter element comprises a pleated composite comprising a filter medium having an upstream side and a downstream side and at least one of an upstream drainage layer disposed on the upstream side of the filter medium and a downstream drainage layer disposed on the downstream side of the filter medium.

3. A filter as claimed in claim 2 wherein the upstream and downstream drainage layers have approximately the same edgewise flow resistance.

4. A filter as claimed in claim 2 wherein at least one of the drainage layers comprises a mesh.

5. A filter as claimed in claim 4 wherein the mesh comprises an extruded polymeric mesh having strands oriented so as not to nest when the pleats are in the laid-over state.

6. A filter as claimed in claim 5 wherein the mesh comprises a first set of strands disposed opposite a surface of the filter medium and a second set of strands separated from the surface of the filter medium by the first set of strands, wherein the strands in the second set of strands extend along lines forming an angle between 0 degrees and 90 degrees with respect to the longitudinal axis of the filter element.

7. A filter as claimed in claim 2 wherein at least one of the drainage layers comprises a woven or nonwoven fabric.

8. A filter as claimed in claim 7 wherein at least one of the drainage layers comprises a nonwoven polyester fabric.

9. A filter as claimed in claim 1 wherein the two legs of each pleat have differing heights prior to being formed into a laid-over state.

10. A filter as claimed in claim 1 wherein gaps between opposing surfaces of the pleats adjoining a radially inner periphery of the filter element have a height of at most approximately a thickness t of each leg of the pleats.

11. A filter as claimed in claim 10 wherein the gaps have a height of at most approximately ½ t.

12. A filter as claimed in claim 1 wherein gaps between opposing surfaces of the pleats adjoining a radially outer periphery of the filter element have a height of at most approximately four times a thickness t of each leg of the pleat.

13. A filter as claimed in claim 12 wherein the gaps have a height of at most approximately 2 t.

14. A filter as claimed in claim 1 wherein the pleats extend in an arcuate manner from a radial inner periphery towards a radial outer periphery of the filter element.

15. A filter as claimed in claim 1 wherein the filter element comprises a pleated composite including a filter medium and an insert, the insert being sealed to the first end cap and having an axial width less than the axial length of the filter element and a higher affinity for sealing to the first end cap than the filter medium.

16. A filter as claimed in claim 15 wherein the insert has an axial width of approximately 0.5 inches.

17. A filter as claimed in claim 15 wherein the first end cap and the insert comprise a fluoropolymer.

18. A filter as claimed in claim 1 wherein each pleat has a smooth radius along a radial outer periphery of the filter element.

19. A filter as claimed in claim 1 wherein the continuous region extends for at least approximately 75% of the axial length of the filter element.

20. A filter as claimed in claim 18 wherein the continuous region extends for at least approximately 95% of the axial length of the filter element.

21. A filter as claimed in claim 1 wherein each pleat has a height of at least approximately 80% of $$h_{max}=(D^2-d^2)/[4(d+2\ t)]$$

wherein D is an outer diameter of the filter element, d is an inner diameter of the filter element, and t is a thickness of each leg of the pleat.

22. A filter as claimed in claim 21 wherein each pleat has a height of at least approximately 90% of $h_{max}$.

23. A filter as claimed in claim 1 wherein the filter element includes a filter medium comprising a porous film.

24. A filter as claimed in claim 1 wherein the filter element includes a filter medium comprising a fibrous material.

25. A filter as claimed in claim 1 including a retaining member for retaining the pleats in the laid-over state.

26. A filter as claimed in claim 25 wherein the retaining member comprises a cage disposed around the filter element and having openings for the passage of fluid.

27. A filter as claimed in claim 25 wherein the retaining member comprises a wrap member helically wrapped around the filter element in a plurality of turns.

28. A filter as claimed in claim 27 wherein the pleats have peaks defining an outer surface of the filter element, and a helical gap is formed between adjacent turns of the wrap member, the total area of the helical gap being less than about one-half of the total area of the surface defined by the peaks of the pleats.

29. A filter as claimed in claim 28 wherein the total area of the helical gap is approximately 6% to approximately 30% of the total area of the surface defined by the peaks of the pleats.

30. A filter as claimed in claim 1 wherein the pleated filter element includes a filter medium, first and second drainage layers disposed on opposite sides of the filter medium, and a cushioning layer disposed between the first drainage layer and the filter medium.

31. A filter as claimed in claim 30 wherein the cushioning layer comprises a material smoother than the first drainage layer.

32. A filter as claimed in claim 30 wherein the cushioning layer comprises a material having greater resistance to abrasion than the filter medium.

33. A filter as claimed in claim 1 further comprising a second impervious end cap attached to the second end surface of the filter element, at least one of the first and second end caps being an open end cap.

34. A filter as claimed in claim 33 wherein the end caps are sealed to the end surfaces of the filter element to prevent fluid from passing through the end surfaces.

35. A filter element as claimed in claim 1 wherein the filter element includes a filter medium and first and second drainage layers disposed on opposite sides of the filter medium and wherein a height h of each pleat is greater than (D−d)/2 and less than $h_{max}=(D^2-d^2)/[4(d+2\ t)]$ where D and d are an outer diameter and an inner diameter, respectively, of the filter element and t is a thickness of each leg.

36. A filter element as claimed in claim 35 wherein each drainage layer comprises an extruded mesh, each mesh having strands oriented so as not to nest when the pleats are in the laid-over state.

37. A filter element as claimed in claim 36 wherein each mesh has a mesh count of at least 10 strands per inch.

38. A filter as claimed in claim 1 wherein the filter element comprises a pleated composite including a filter medium having an upstream side and a downstream side, a first extruded mesh layer disposed on the upstream side and a second extruded mesh layer disposed on the downstream side of the filter medium, and first and second cushioning layers disposed between the filter medium and the first and second mesh layers, respectively, each cushioning layer comprising a material having greater resistance to abrasion than the filter medium.

39. A filter as claimed in claim 38 wherein gaps between opposing surfaces of the pleats adjoining a radially inner periphery of the filter element have a height of at most approximately a thickness t of each leg of the pleats, gaps between opposing surfaces of the pleats adjoining a radially outer periphery of the filter element have a height of at most approximately 4 t, and the continuous region extends for at least approximately 95% of the axial length of the filter element.

40. A filter as claimed in claim 38 wherein the two legs of each pleat have differing heights prior to being formed into a laid-over state.

41. A filter as claimed in claim 38 wherein each pleat has a height of at least approximately 80% of $$h_{max}=(D^2-d^2)/[4(d+2\ t)]$$

wherein D is an outer diameter of the filter element, and d is an inner diameter of the filter element.

42. A filter as claimed in claim 1 wherein the filter element comprises a pleated composite including a filter medium having an upstream side and a downstream side, a first polymeric mesh layer disposed on the upstream side and a second polymeric mesh layer disposed on the downstream side of the filter medium, and a nonwoven fabric cushioning layer disposed between the filter medium and the first mesh layer, the filter medium comprising a nonwoven fabric substrate on the downstream side of the filter medium and a layer of glass fibers supported on the substrate on the upstream side of the filter medium, the cushioning layer protecting the glass fiber layer from abrasion.

43. A filter as claimed in claim 1 wherein the filter element comprises a pleated composite including a filter medium comprising a fibrous sheet having an upstream side and a downstream side, a first extruded polymeric mesh layer disposed on the upstream side and a second extruded polypropylene mesh layer disposed on the downstream side of the filter medium.

44. A filter as claimed in claim 43 wherein the filter medium comprises a melt-blown medium.

45. A filter as claimed in claim 1 wherein the filter element comprises a pleated composite comprising a filter medium having an upstream side and a downstream side, a first extruded mesh layer disposed on the upstream side, and a second extruded mesh layer disposed on the downstream side of the filter medium, one of the mesh layers defining the first surface of each leg and the other of the mesh layers defining the second surface of each leg, each mesh having strands oriented so as not to nest when the pleats are in the laid-over state.

46. A filter as claimed in claim 1 wherein the filter element comprises a pleated composite comprising a filter medium including a porous membrane having an upstream and a downstream side, a first drainage layer of a woven or non-woven fabric disposed on the upstream side of the porous membrane, and a second drainage layer of a woven or non-woven fabric disposed on the downstream side of the porous membrane.

47. A filter as claimed in claim 46 wherein the porous membrane comprises a polytetrafluoroethylene membrane.

48. A filter as claimed in claim 46 wherein the porous membrane comprises a nylon membrane.

49. A filter as claimed in claim 1 wherein the filter element comprises a pleated composite comprising a filter medium and first and second drainage layers on opposite sides of the filter medium, the filter further comprising a wrap member for retaining the pleats in the laid-over state and helically wrapped around the filter element in a plurality of turns with a helical gap being formed between adjacent turns of the wrap member, the pleats having peaks defining an outer surface of the filter element, the total area of the helical gap being approximately 6% to approximately 30% of the total area of the total area of the surface defined by the peaks of the pleats.

50. A filter as claimed in claim 1 wherein the first end cap comprises a fluoropolymer and wherein the filter element comprises a pleated composite comprising a filter medium having an upstream side and a downstream side, first and second drainage layers disposed on the upstream and downstream sides of the filter medium, and a fluoropolymer insert sealed to the first end cap and having an axial width less than the axial length of the filter element and a greater affinity for sealing to the first end cap than the filter medium.

51. A filter as claimed in claim 1 wherein the filter element comprises a pleated composite comprising a filter medium having an upstream side and a downstream side, a first extruded mesh layer disposed on the upstream side and a second extruded mesh layer disposed on the downstream side of the filter medium, and a cushioning layer disposed between the filter medium and the first mesh layer and comprising a material having greater resistance to abrasion than the filter medium, each pleat having a height h at least approximately 80% of $$h_{max} = (D^2 - d^2)/[4(d+2\ t)]$$

wherein D is an outer diameter of the filter element, d is an inner diameter of the filter element, and t is a thickness of each leg of the pleat.

52. The filter as claimed in claim 1 wherein the impervious end cap comprises an open end cap.

53. The filter as claimed in claim 1 wherein the impervious end cap comprises a blind end cap.

54. A filter for separating one or more substances from a fluid flowing therethrough, the filter comprising: a pleated filter element having an interior, a longitudinal axis, first and second end surfaces, and a plurality of longitudinal pleats, wherein each of the pleats has a curved configuration and includes a crown, a root, and a pair of legs and each of the legs has a first surface and a second surface, the legs of each pleat being joined to one another at the crown and joined to a leg of an adjacent pleat at the root and the pleats being in a laid-over state in which the first a surface of one leg on one pleat is in intimate contact with the first surface of an adjoining leg of said one pleat and the second surface of said one leg is in intimate contact with the second surface of an adjoining leg of an adjacent pleat over substantially the entire height of each leg and over a continuous region extending for at least approximately 50 percent of the longitudinal length of the pleated filter element and wherein the pleated filter element comprises at least first and second layers, wherein the second layer comprises a filter medium, and first and second end elements sealingly arranged with the first and second ends, respectively, of the pleated filter element, at least one of the end elements comprising an open end element.

55. The filter of claim 54 wherein the first layer comprises a drainage layer providing even fluid flow to or from the filter medium, the drainage layer having an edgewise flow resistance which provides a lower pressure drop in the drainage layer than the pressure drop across the filter medium.

56. The filter of claim 54 wherein the first layer comprises a drainage layer including a woven or non-woven sheet.

57. The filter of claim 54 wherein the first layer comprises a drainage layer including a mesh or screen.

58. The filter of claim 57 wherein the drainage layer comprises an extruded polymeric mesh having first and second sets of parallel strands, the first set of strands being disposed between the filter medium and the second set of strands.

59. The filter of claim 58 wherein the first set of strands has a mesh count of at least 10 strands per inch.

60. The filter of claim 54 wherein the first layer comprises an upstream drainage layer and the pleated filter element further comprises a downstream drainage layer, the filter medium being disposed between the upstream and downstream drainage layers.

61. The filter of claim 60 wherein the upstream and downstream drainage layers have substantially the same edgewise flow resistance.

62. The filter of claim 60 wherein the upstream and downstream drainage layers comprise identical materials.

63. The filter of claim 60 wherein the upstream and downstream drainage layers have different characteristics.

64. The filter of claim 60 wherein the upstream drainage layer is thicker than the downstream drainage layer.

65. The filter of claim 54 wherein the first layer comprises a drainage layer and wherein the pleated filter element further comprises a cushioning layer disposed between the drainage layer and the filter medium, the cushioning layer being smoother than the drainage layer and having a higher resistance to abrasion than the filter medium.

66. The filter of claim 65 wherein the cushioning layer comprises a non-woven fabric.

67. The filter of claim 64 wherein the filter medium comprises a porous polymeric membrane.

68. The filter of claim 54 wherein the filter medium comprises a fibrous material.

69. The filter of claim 68 wherein the filter medium has a graded pore structure including a finer pored region and a coarser pored region disposed upstream from the finer pored region.

70. The filter of claim 54 wherein the filter medium comprises at least first and second filter medium layers.

71. The filter of claim 70 wherein the first and second filter medium layers have different filtering characteristics.

72. The filter of claim 71 wherein the first filter medium layer comprises a prefilter.

73. The filter of claim 54 wherein the first layer comprises a prefilter.

74. The filter of claim 54 wherein the filter medium has a removal rating in the range from 0.2 micron to 90 microns.

75. The filter of claim 54 wherein the first layer comprises a drainage layer and wherein the pleated filter element has an outer diameter (D) and an inner (d) and comprises a pleated composite including the drainage layer and the filter medium and having a thickness (t) and wherein the height of each pleat is greater than (D–d)/2 and is less than $h_{MAX}=(D^2-d^2)/4(d+2\ t)$.

76. The filter of claim 75 wherein the height of each pleat is at least 80 percent of $h_{MAX}$.

77. The filter of claim 54 wherein there is substantially no empty space between adjacent pleats.

78. The filter of claim 54 wherein the first and second end elements comprise first and second end caps sealing the first and second ends, respectively, of the pleated filter element, at least one of the first and second end caps comprising an open end cap.

79. The filter of claim 54 further comprising a retainer around the pleated filter element to maintain the pleats in the laid-over state.

80. The filter of claim 79 wherein the retainer comprises a wrap including at least one strip helically wrapped around the laid-over pleats.

81. The filter of claim 54 wherein the first layer comprises an upstream drainage layer and the pleated filter element further comprises a downstream drainage layer, the filter medium being disposed between the upstream and downstream drainage layers and the upstream drainage layer having an edgewise flow resistance providing a lower pressure drop in the upstream drainage layer than the pressure drop across the filter medium.

82. The filter of claim 81 wherein the upstream and downstream drainage layers have substantially the same edgewise flow resistance.

83. The filter of claim 82 wherein the pleated filter element has an outer diameter (D) and an inner (d) and comprises a pleated composite including the first and second drainage layers and the filter medium and having a thickness (t) and wherein the height of each pleat is greater than (D–D)/2 and is less than $h_{MAX}=(D^2-d^2)/4(d+2\ t)$.

84. The filter of claim 83 wherein the height of each pleat is at least 80 percent of $h_{MAX}$.

85. The filter of claim 82 wherein the pleated filter element has an outer diameter (D) and an inner diameter (d) and comprises a pleated composite including the first and second drainage layers and the filter medium and having a thickness (t), wherein the height of each pleat is greater than (D–D)/2 and is less than $h_{MAX}=(D^2-d^2)/4(d+2\ t)$, and wherein the upstream drainage layer comprises an extruded polymeric mesh having first and second sets of parallel strands, the first set of strands being disposed between the filter medium and the second set of strands.

86. The filter of claim 85 wherein the first set of strands has a mesh count of at least 10 strands per inch.

87. The filter of claim 81 wherein the pleated filter element has an outer diameter (D) and an inner diameter (d) and comprises a pleated composite including the first and second drainage layers and the filter medium and having a thickness (t), and wherein the height of each pleat is greater than (D–D)/2 and is less than $h_{MAX}=(D^2-d^2)/4(d+2\ t)$.

88. The filter of claim 87 wherein the upstream drainage layer comprises an extruded polymeric mesh having first and second sets of parallel strands, the first set of strands being disposed between the filter medium and the second set of strands.

89. The filter of claim 88 wherein the first set of strands has a mesh count of at least 10 strands per inch.

90. The filter of claim 89 wherein the downstream drainage layer comprises an extruded polymeric mesh having first and second sets of parallel strands, the first set of strands being disposed between the filter medium and the second set of strands.

91. The filter of claim 87 wherein the height of each pleat is at least 80 percent of $h_{MAX}$.

92. A filter for separating one or more substances from a fluid flowing therethrough, the filter comprising:

a pleated filter element including an outer diameter (D), an inner diameter (d), a longitudinal axis, first and second end surfaces, and a plurality of longitudinal pleats, wherein the pleated filter element comprises a pleated composite having a thickness (t) and including an upstream drainage layer, a downstream drainage layer, and a filter medium disposed between the upstream and downstream drainage layers, the upstream drainage layer having an edgewise flow resistance which provides a lower pressure drop in the upstream drainage layer than the pressure drop across the filter medium, thereby providing an even distribution of fluid along an upstream surface of the filter medium, wherein each of the pleats has a curved configuration and includes a crown, a root, and a pair of legs and each of the legs has a first surface and a second surface, the legs of each pleat being joined to one another at the crown and joined to a leg of an adjacent pleat at the root and the pleats being in a laid-over state in which the first surface of one leg of one pleat is in intimate contact with the first surface of an adjoining leg of said one pleat and the second surface of said one leg is in intimate contact with the second surface of an adjoining leg of an adjacent pleat over substantially the entire height of each leg and over a continuous region extending for at least approximately 95% of the longitudinal length of the pleated filter element, and wherein the height of each pleat is greater than (D–D)/2 and is no greater than $(D^2-d^2)/4(d+2\ t)$, and first and second end elements sealingly arranged with the first and second ends, respectively, of the pleated filter element, at least one of the end elements comprising an open end element.

93. The filter of claim 92 wherein the upstream and downstream drainage layers each comprise a woven or non-woven sheet and the filter medium comprises a porous polymeric membrane.

94. The filter of claim 93 wherein the porous membrane comprises a nylon membrane.

95. The filter of claim 93 wherein the upstream and downstream drainage fabric and the porous membrane comprise a fluoropolymer.

96. The filter of claim 95 wherein the end elements comprise a fluoropolymer and the pleated composite further includes a fluoropolymer insert sealed to each end element and having a width less than the axial length of the filter element and a greater affinity for sealing to the end element than the filter medium.

97. The filter of any one of claims 92–96 wherein there is substantially no empty space between adjacent pleats.

98. The filter of claim 92 wherein the upstream and downstream drainage layers comprise a mesh or screen and the filter medium comprises a fibrous material.

99. The filter of claim 98 wherein the fibrous material comprises a fibrous depth filter.

100. The filter of claim 99 wherein the fibrous depth filter has a graded pore structure including a finely pored region and a coarsely pored region disposed upstream from the finely pored region.

101. The filter of claim 99 wherein the fibrous depth filter includes meltblown fibers.

102. The filter of claim 98 wherein the fibrous material comprises glass fibers disposed on a substrate.

103. The filter of claim 102 wherein the pleated composite further comprises a cushioning layer disposed between the upstream drainage layer and the glass fibers, the cushioning layer being smoother than the upstream drainage layer and having a higher resistance to abrasion than the fibrous material.

104. The filter of claim 98 wherein the pleated composite further comprises a cushioning layer disposed between the upstream drainage layer and the fibrous material, the cushioning layer being smoother than the drainage layer and having a higher resistance to abrasion than the filter medium.

105. The filter of any one of claims 92 and 98–104 wherein the upstream and downstream drainage layers each comprise an extruded mesh having first and second sets of parallel strands, the first set of parallel strands being disposed between the filter medium and the second set of parallel strands, and wherein the first set of parallel strands of the upstream drainage layer has a mesh count of at least ten strands per inch.

* * * * *

UNITED STATES PATENT AND TRADEMARK OFFICE
CERTIFICATE OF CORRECTION

PATENT NO. : 5,543,047 C1 Page 1 of 1
APPLICATION NO. : 08/170934
DATED : June 9, 2009
INVENTOR(S) : Stoyell et al.

It is certified that error appears in the above-identified patent and that said Letters Patent is hereby corrected as shown below:

In column 1, lines 15 and 16 should read:

The patentability of claims 21, 22, 35-37, 75, 76, 83-94, 97 and 105 is confirmed.

In column 1, lines 24-26 should read:

Claims 3-7, 11, 13, 20, 26, 34, 48, 58-59, 61-64, 69, 71 and 72, dependent on an amended claim, are determined to be patentable.

Signed and Sealed this

Eleventh Day of August, 2009

David J. Kappos
*Director of the United States Patent and Trademark Office*

UNITED STATES PATENT AND TRADEMARK OFFICE
CERTIFICATE OF CORRECTION

PATENT NO. : 5,543,047 C1
APPLICATION NO. : 90/008891
DATED : June 9, 2009
INVENTOR(S) : Stoyell et al.

Page 1 of 1

It is certified that error appears in the above-identified patent and that said Letters Patent is hereby corrected as shown below:

In column 1, lines 15 and 16 should read:

The patentability of claims 21, 22, 35-37, 75, 76, 83-94, 97 and 105 is confirmed.

In column 1, lines 24-26 should read:

Claims 3-7, 11, 13, 20, 26, 34, 48, 58-59, 61-64, 69, 71 and 72, dependent on an amended claim, are determined to be patentable.

This certificate supersedes the Certificate of Correction issued August 11, 2009.

Signed and Sealed this

Fifteenth Day of September, 2009

David J. Kappos
*Director of the United States Patent and Trademark Office*

(12) EX PARTE REEXAMINATION CERTIFICATE (6862nd)
United States Patent
Stoyell et al.

(10) Number: US 5,543,047 C1
(45) Certificate Issued: Jun. 9, 2009

(54) FILTER WITH OVER-LAID PLEATS IN INTIMATE CONTACT

(75) Inventors: Richard C. Stoyell, Moravia, NY (US); Kenneth M. Williamson, Jamesville, NY (US); Scott D. Hopkins, Dryden, NY (US); Stephen A. Geibel, Cortland, NY (US); Terry L. Wolff, Marathon, NY (US)

(73) Assignee: Pall Corporation, East Hills, NY (US)

Reexamination Request:
No. 90/008,891, Oct. 19, 2007

Reexamination Certificate for:
Patent No.: 5,543,047
Issued: Aug. 6, 1996
Appl. No.: 08/170,934
Filed: Dec. 21, 1993

Related U.S. Application Data

(63) Continuation-in-part of application No. 07/972,839, filed on Nov. 6, 1992, now abandoned.

(51) Int. Cl.
*B01D 29/11* (2006.01)

(52) U.S. Cl. .................. 210/493.2; 210/493.5; 210/509; 493/941; 55/500; 55/521

(58) Field of Classification Search ........................ None
See application file for complete search history.

(56) References Cited

U.S. PATENT DOCUMENTS

| | | |
|---|---|---|
| 1,613,983 A | 1/1927 | Collins |
| 2,321,985 A | 6/1943 | Briggs |
| 2,495,130 A | 1/1950 | Pilliner |
| 2,627,350 A | 2/1953 | Wicks |
| 2,663,660 A | 12/1953 | Layte |
| 2,675,127 A | 4/1954 | Layte |
| 2,677,993 A | 5/1954 | Ens |
| 2,743,019 A | 4/1956 | Kovacs |
| 2,915,997 A | 12/1959 | Seaman |
| 2,962,991 A | 12/1960 | Burgert |
| 3,022,861 A | 2/1962 | Harms |
| 3,054,507 A | 9/1962 | Humbert, Jr. et al. |
| 3,057,481 A | 10/1962 | Pall |
| 3,183,334 A | 5/1965 | Bray |
| D207,487 S | 4/1967 | Briggs et al. |
| 3,666,097 A | 5/1972 | Ryan |
| 3,720,323 A | 3/1973 | Landree |
| 3,891,551 A | 6/1975 | Tiedemann |
| 4,007,113 A | 2/1977 | Ostreicher |
| 4,007,114 A | 2/1977 | Ostreicher |
| 4,051,033 A | 9/1977 | Blace |

(Continued)

FOREIGN PATENT DOCUMENTS

| | | |
|---|---|---|
| CA | 527620 | 7/1956 |
| CA | 649680 | 10/1962 |
| DE | Z2684IVC/12D | 2/1956 |

(Continued)

OTHER PUBLICATIONS

Intercompany report, "An Advanced Cartridge Filter Design Concept", Mar. 18, 1993.
Brochure from Chandler Co., "Sidepleater", (date unknown).
Chandler Machine Sales, Co., Inc., "Press Release", (1993).
Photograph of pleated object (1998).

(Continued)

*Primary Examiner*—Krisanne Jastrzab

(57) ABSTRACT

A filter includes a cylindrical filter element having a longitudinal axis, first and second end surfaces, and a plurality of longitudinal pleats. Each of the pleats has a pair of legs with first and second surfaces. The pleats are in a laid-over state in which the first surface of each leg is in intimate contact with the first surface of an adjoining leg and the second surface of each leg is in intimate contact with the second surface of an adjoining leg over substantially the entire height of each leg and over a continuous region extending for at least approximately 50% of the axial length of the filter element. An impervious end cap is connected to the first end surface of the filter element.

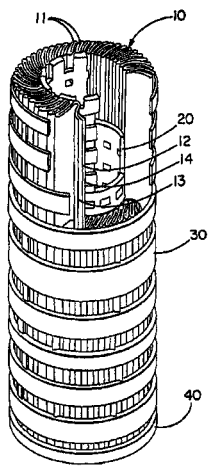

U.S. PATENT DOCUMENTS

| | | |
|---|---|---|
| 4,058,456 A | 11/1977 | Head |
| 4,158,699 A | 6/1979 | Volfkovich et al. |
| 4,172,797 A | 10/1979 | Robichaud et al. |
| 4,223,597 A | 9/1980 | Lebet |
| 4,301,013 A | 11/1981 | Setti et al. |
| 4,321,288 A | 3/1982 | Ostreicher |
| 4,363,572 A | 12/1982 | Harvey |
| 4,405,466 A | 9/1983 | Giannelli et al. |
| 4,422,861 A | 12/1983 | Dusza |
| 4,501,663 A | 2/1985 | Merrill |
| 4,523,995 A | 6/1985 | Pall et al. |
| 4,543,112 A | 9/1985 | Ackley et al. |
| 4,615,804 A | 10/1986 | Wright |
| 4,617,128 A | 10/1986 | Ostreicher |
| 4,650,102 A | 3/1987 | Arbetter |
| 4,693,985 A | 9/1987 | Degen et al. |
| 4,734,208 A | 3/1988 | Pall et al. |
| 4,767,426 A | 8/1988 | Daly et al. |
| 4,789,526 A | 12/1988 | Matkovich |
| 4,793,051 A | 12/1988 | Golden et al. |
| 4,797,259 A | 1/1989 | Matkovich et al. |
| 4,797,260 A | 1/1989 | Parker |
| 4,802,982 A | 2/1989 | Lien |
| 4,814,033 A | 3/1989 | Spearman et al. |
| 4,826,597 A | 5/1989 | Silverwater et al. |
| 4,826,600 A | 5/1989 | Ely et al. |
| 4,828,698 A | 5/1989 | Jewell et al. |
| 4,836,931 A | 6/1989 | Spearman et al. |
| 4,839,037 A | 6/1989 | Bertelsen et al. |
| 4,842,739 A | 6/1989 | Tang |
| 4,865,637 A | 9/1989 | Gruber |
| 4,944,887 A | 7/1990 | Frederick |
| 4,963,325 A | 10/1990 | Lennon et al. |
| 4,976,926 A | 12/1990 | Matkovich |
| 5,006,235 A | 4/1991 | Cooper |
| 5,064,598 A | 11/1991 | Seiler |
| 5,084,245 A | 1/1992 | Berke et al. |
| 5,104,540 A | 4/1992 | Day et al. |
| 5,114,508 A | 5/1992 | Miyagi et al. |
| 5,126,054 A | 6/1992 | Matkovich |
| 5,126,189 A | 6/1992 | Tanny et al. |
| 5,130,023 A | 7/1992 | Feint |
| 5,149,449 A | 9/1992 | Strid et al. |
| 5,160,563 A | 11/1992 | Kutchmarek et al. |
| 5,166,051 A | 11/1992 | Killeen et al. |
| 5,250,179 A | 10/1993 | Spearman |
| 5,252,207 A | 10/1993 | Miller et al. |
| 5,256,372 A | 10/1993 | Brooks et al. |
| 5,266,219 A | 11/1993 | Pall et al. |
| 5,275,743 A | 1/1994 | Miller et al. |
| 5,279,731 A | 1/1994 | Cook et al. |
| 5,290,502 A | 3/1994 | Jeffery et al. |
| 5,296,134 A | 3/1994 | Zaiter |
| 5,362,522 A | 11/1994 | Barri et al. |
| 5,376,278 A | 12/1994 | Salem |
| 5,387,344 A | 2/1995 | McCombs et al. |
| 5,393,101 A | 2/1995 | Matkovich |
| 5,403,482 A | 4/1995 | Steere et al. |
| 5,419,833 A | 5/1995 | Ely et al. |
| 5,419,870 A | 5/1995 | Parker |
| 5,421,977 A | 6/1995 | Getsy et al. |
| 5,448,419 A | 9/1995 | Bigelow et al. |
| 5,451,321 A | 9/1995 | Matkovich |
| 5,456,836 A | 10/1995 | Jeffery et al. |
| 5,460,974 A | 10/1995 | Kozak et al. |
| 5,468,397 A | 11/1995 | Barboza et al. |
| 5,472,606 A | 12/1995 | Steere et al. |
| 5,480,538 A | 1/1996 | McCombs et al. |
| 5,480,554 A | 1/1996 | Degen et al. |
| 5,490,868 A | 2/1996 | Whitlock et al. |
| 5,543,047 A | 8/1996 | Stoyell et al. |
| 5,567,664 A | 10/1996 | Barri et al. |
| 5,591,338 A | 1/1997 | Pruette et al. |
| 5,601,730 A | 2/1997 | Page et al. |
| 5,605,631 A | 2/1997 | Barri et al. |
| 5,664,628 A | 9/1997 | Koehler |
| 5,685,991 A | 11/1997 | Degen et al. |
| 5,690,765 A | 11/1997 | Stoyell et al. |
| 5,702,552 A | 12/1997 | Kutchmarek et al. |
| 5,725,784 A | 3/1998 | Geibel et al. |
| 6,113,784 A | 9/2000 | Stoyell et al. |
| 7,083,564 B2 | 8/2006 | Stoyell et al. |
| 2006/0183619 A1 | 8/2006 | Stoyell et al. |

FOREIGN PATENT DOCUMENTS

| | | |
|---|---|---|
| DE | 1949823 | 6/1970 |
| DE | 1611087 | 10/1970 |
| DE | 1611083 | 5/1971 |
| DE | 2305128 | 8/1974 |
| DE | 2908625 | 9/1979 |
| DE | 3935503 | 5/1991 |
| EP | 0391648 | 10/1990 |
| EP | 0648524 | 10/1994 |
| GB | 480810 | 3/1938 |
| GB | 725066 | 3/1955 |
| GB | 725618 | 3/1955 |
| GB | 764254 | 12/1956 |
| GB | 823648 | 11/1959 |
| GB | 1052221 | 12/1966 |
| GB | 1075714 | 7/1967 |
| GB | 2015890 A | 9/1979 |
| GB | 2138693 | 10/1984 |
| GB | 2214447 | 9/1989 |
| JP | 56-21459 U | 5/1981 |
| JP | 59-86228 | 1/1984 |
| JP | 60-125220 | 7/1985 |
| JP | 61-227809 | 10/1986 |
| JP | 63-59305 | 1/1988 |
| JP | 4-227810 | 8/1992 |
| JP | 61-61012 | 9/1994 |
| SU | 492309 | 1/1976 |
| SU | 1255165 | 9/1986 |
| SU | SU 1761201 A1 | 9/1992 |
| WO | WO 94/05344 | 3/1994 |
| WO | WO 94/11082 | 5/1994 |
| WO | WO 98/31447 | 7/1998 |

OTHER PUBLICATIONS

Baumann et al., "What the Filter Man Needs to Know About Filtration" American Institute of Chemical Engineers, vol. 73, #171, (1977), pp. 26–32.

Dickey et al., "Theory and Practice of Filtration", Modern Library of Chemical Engineering, (1946), Fig. 19.

Gollan et al., Hydrodynamic Aspects of Semi–Dense Pleat Designs in Pleated Cartridges. Filtration & Separation, (1985), pp. 326–329.

Theodore H. Meltzer, "Filtration in the Pharmaceutical Industry", Marcel Dekker, Inc., (1987), pp. 727–728.

Shoemaker, Wells, "Impact of the Membrane on the Suppliers to the Membrane Industry", Jan./Feb. 1988, pp. 34–39.

Shoemaker, Wells, "The Impact of the Membrane Industry on the Suppliers to the Membrane Industry: Implications for the Product Development Scientist" Fourth Membrane conference Business Communication Co., 1986, pp. 38–46.

Shoemaker, Wells, "What the Filterman Needs to Know About Filtration" American Institute of Chemical Engineers, vol. 73, No. 171, New York, NY, 1977, pp. 1–110.

Photograph of pleated object (1998).

Photograph of pleated object (1998).
Photograph of pleated object (1998).
Photograph of pleated object (1998).
Photograph of pleated object (1998).
Photograph of pleated object (1998).

Photograph of pleated object (1998).

Photograph of pleated object (1998).

Product specification for POLYPRO © from CUNO, Inc., 1988.

US 5,543,047 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 83–94, 97 and 105 is confirmed.

Claims 1, 54 and 81–82 are cancelled.

Claims 2, 9–10, 12, 14, 18–19, 24–25, 33, 45–46, 52, 53, 55–57, 60, 68, 70, 73–74 and 77–79 are determined to be patentable as amended.

Claims 3–7, 11, 13, 20–22, 26, 34–37, 48, 58–59, 61–64, 69, 71–72 and 75–76, dependent on an amended claim, are determined to be patentable.

Claims 8, 15–17, 23, 27–32, 38–44, 47, 49–51, 65–67, 80, 95, 96 and 98–104 were not reexamined.

2. A filter as claimed in claim [1] *35* wherein the filter element comprises a pleated composite comprising [a] *the* filter medium having an upstream side and a downstream side [and at least one of], *the first drainage layer comprising* an upstream drainage layer disposed on the upstream side of the filter medium and *the second drainage layer comprising* a downstream drainage layer disposed on the downstream side of the filter medium.

9. A filter as claimed in claim [1] *35* wherein the two legs of each pleat have differing heights prior to being formed into a laid-over state.

10. A filter as claimed in claim [1] *35* wherein gaps between opposing surfaces of the pleats adjoining a radially inner periphery of the filter element have a height of at most approximately a thickness t of each leg of the pleats.

12. A filter as claimed in claim [1] *35* wherein gaps between opposing surfaces of the pleats adjoining a radially outer periphery of the filter element have a height of at most approximately four times a thickness t of each leg of the pleat.

14. A filter as claimed in claim [1] *35* wherein the pleats extend in an arcuate manner from a radial inner periphery towards a radial outer periphery of the filter element.

18. A filter as claimed in claim [1] *35* wherein each pleat has a smooth radius along a radial outer periphery of the filter element.

19. A filter as claimed in claim [1] *35* wherein the continuous region extends for at least approximately 75% of the axial length of the filter element.

24. A filter as claimed in claim [1] *35* wherein the filter element includes a filter medium comprising a fibrous material.

25. A filter as claimed in claim [1] *35* including a retaining member for retaining the pleats in the laid-over state.

33. A filter as claimed in claim [1] *35* further comprising a second impervious end cap attached to the second end surface of the filter element, at least one of the first and second end caps being an open end cap.

45. A filter as claimed in claim [1] *35* wherein the fiter element comprises a pleated composite comprising [a] *the* filter medium having an upstream side and a downstream side, *the first drainage layer comprising* a first extruded mesh layer disposed on the upstream side, and *the second drainage layer comprising* a second extruded mesh layer disposed on the downstream side of the filter medium, one of the mesh layers defining the first surface of each leg and the other of the mesh layers defining the second surface of each leg, each mesh having strands oriented so as not to nest when the pleats are in the laid-over state.

46. A filter as claimed in claim [1] *35* wherein the filter element comprises a pleated composite comprising [a] *the* filter medium including a porous membrane having an upstream and a downstream side, [a] *the* first drainage layer [of] *comprising* a woven or non-woven fabric disposed on the upstream side of the porous membrane, and [a] *the* second drainage layer [of] *comprising* a woven or non-woven fabric disposed on the downstream side of the porous membrane.

52. The filter as claimed in claim [1] *35* wherein the impervious end cap comprises an open end cap.

53. The filter as claimed in claim [1] *35* wherein the impervious end cap comprises a blind end cap.

55. The filter of claim [54] *75* wherein the first layer comprises a drainage layer providing even fluid flow to or from the filter medium, the drainage layer having an edgewise flow resistance which provides a lower pressure drop in the drainage layer than the pressure drop across the filter medium.

56. The filter of claim [54] *75* wherein the first layer comprises a drainage layer including a woven or non-woven sheet.

57. The filter of claim [54] *75* wherein the first layer comprises a drainage layer including a mesh or screen.

60. The filter of claim [54] *75* wherein the first layer comprises an upstream drainage layer and the pleated filter element further comprises a downstream drainage layer, the filter medium being disposed between the upstream and downstream drainage layers.

68. The filter of claim [54] *75* wherein the filter medium comprises a fibrous material.

70. The filter of claim [54] *75* wherein the filter medium comprises at least first and second filter medium layers.

73. The filter of claim [54] *75* wherein the first layer comprises a prefilter.

74. The filter of claim [54] *75* wherein the filter medium has a removal rating in the range from 0.2 micron to 90 microns.

77. The filter of claim [54] *75* wherein there is substantially no empty space between adjacent pleats.

78. The filter of claim [54] *75* wherein the first and second end elements comprise first and second end caps sealing the first and second ends, respectively, of the pleated filter element, at least one of the first and second end caps comprising an open end cap.

79. The filter of claim [54] *75* further comprising a retainer around the pleated filter element to maintain the pleats in the laid-over state.

\* \* \* \* \*

(12) EX PARTE REEXAMINATION CERTIFICATE (8838th)
United States Patent
Stoyell et al.

(10) Number: US 5,543,047 C2
(45) Certificate Issued: Jan. 31, 2012

(54) FILTER WITH OVER-LAID PLEATS IN INTIMATE CONTACT

(75) Inventors: Richard C. Stoyell, Moravia, NY (US); Kenneth M. Williamson, Jamesville, NY (US); Scott D. Hopkins, Dryden, NY (US); Stephen A. Geibel, Cortland, NY (US); Terry L. Wolff, Marathon, NY (US)

(73) Assignee: Pall Corporation, East Hills, NY (US)

Reexamination Request:
No. 90/009,610, Oct. 22, 2009

Reexamination Certificate for:
Patent No.: 5,543,047
Issued: Aug. 6, 1996
Appl. No.: 08/170,934
Filed: Dec. 21, 1993

Reexamination Certificate C1 5,543,047 issued Jun. 9, 2009

Certificate of Correction issued Aug. 11, 2009.

Certificate of Correction issued Sep. 15, 2009.

Related U.S. Application Data

(63) Continuation-in-part of application No. 07/972,839, filed on Nov. 6, 1992, now abandoned.

(51) Int. Cl.
*B01D 27/06* (2006.01)

(52) U.S. Cl. .................. 210/493.2; 210/493.5; 210/509; 493/941; 55/500; 55/502

(58) Field of Classification Search .................... 210/493
See application file for complete search history.

(56) References Cited

To view the complete listing of prior art documents cited during the proceeding for Reexamination Control Number 90/009,610, please refer to the USPTO's public Patent Application Information Retrieval (PAIR) system under the Display References tab.

*Primary Examiner* — Krisanne Jastrzab

(57) ABSTRACT

A filter includes a cylindrical filter element having a longitudinal axis, first and second end surfaces, and a plurality of longitudinal pleats. Each of the pleats has a pair of legs with first and second surfaces. The pleats are in a laid-over state in which the first surface of each leg is in intimate contact with the first surface of an adjoining leg and the second surface of each leg is in intimate contact with the second surface of an adjoining leg over substantially the entire height of each leg and over a continuous region extending for at least approximately 50% of the axial length of the filter element. An impervious end cap is connected to the first end surface of the filter element.

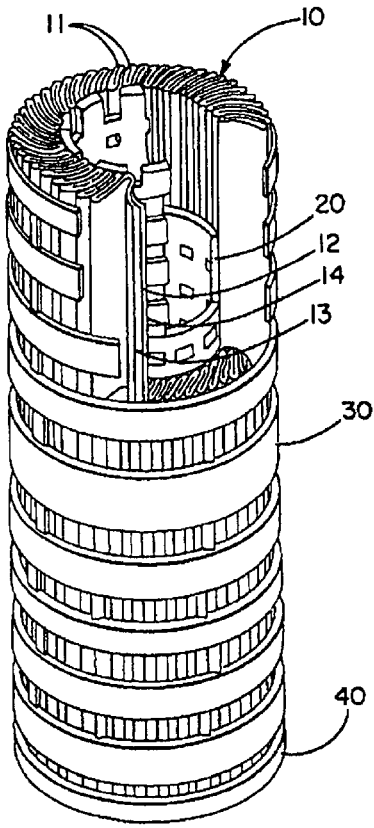

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 35-37, 83-94, 97 and 105 is confirmed.

Claims 1, 54 and 81-82 were previously cancelled.

Claim 60 is cancelled.

Claims 21, 61-64, 73 and 75 are determined to be patentable as amended.

Claims 22 and 76, dependent on an amended claim, is determined to be patentable.

Claims 2-20, 23-34, 38-53, 55-59, 65-72, 74, 77-80, 95-96, and 98-104 were not reexamined.

21. A filter as claimed in claim [1] *35* wherein each pleat has a height of at least approximately 80% of $$h_{max}=(D^2-d^2)/[4(d+2t)]$$

wherein D is an outer diameter of the filter element, d is an inner diameter of the filter element, and t is a thickness of each leg of the pleat.

61. The filter of claim [60] *75* wherein the upstream and downstream drainage layers have substantially the same edgewise flow resistance.

62. The filter of claim [60] *75* wherein the upstream and downstream drainage layers comprise identical materials.

63. The filter of claim [60] *75* wherein the upstream and downstream drainage layers have different characteristics.

64. The filter of claim [60] *75* wherein the upstream layer is thicker than the downstream drainage layer.

73. The filter of claim 75 wherein the [first layer] *filter medium* comprises a prefilter.

75. The filter of claim 54 wherein the first layer comprises [a] *an upstream* drainage layer and wherein the pleated filter element *further comprises a downstream drainage layer, the filter medium being disposed between the upstream and downstream drainage layers, and the filter element* has an outer diameter (D) and an inner (d) and comprises a pleated composite including the drainage [layer] *layers* and the filter medium and having a thickness (t) and wherein the height of each pleat is greater than (D−d)/2 and is less than $h_{max}=(D^2-d^2)/4(d+2t)$.

* * * * *